(12) United States Patent
Brightwell et al.

(10) Patent No.: US 11,157,870 B2
(45) Date of Patent: Oct. 26, 2021

(54) SYSTEM FOR CROWDSOURCED COLD-CHAIN COMPLIANT ITEM SELECTION

(71) Applicant: Walmart Apollo, LLC, Bentonville, AR (US)

(72) Inventors: David Blair Brightwell, Bentonville, AR (US); Cristy Crane Brooks, Cassville, MO (US); Benjamin D. Enssle, Bella Vista, AR (US); Greg Bryan, Bentonville, AR (US); Jesse Lee Eaton, Springdale, AR (US); Jeffrey Kerbs, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 332 days.

(21) Appl. No.: 16/231,413

(22) Filed: Dec. 22, 2018

(65) Prior Publication Data

US 2019/0213532 A1    Jul. 11, 2019

Related U.S. Application Data

(60) Provisional application No. 62/615,960, filed on Jan. 11, 2018.

(51) Int. Cl.
*B65B 63/08*    (2006.01)
*B65B 55/20*    (2006.01)
(Continued)

(52) U.S. Cl.
CPC ....... *G06Q 10/087* (2013.01); *G06Q 10/0832* (2013.01); *G06Q 30/0235* (2013.01); *G06Q 30/0637* (2013.01)

(58) Field of Classification Search
CPC ............. G06Q 10/087; G06Q 10/0832; G06Q 30/0235; G06Q 30/0637
See application file for complete search history.

(56) References Cited

U.S. PATENT DOCUMENTS 6,536,189 B1 * 3/2003 Murray ................. B65B 25/001
53/440
9,373,099 B2 * 6/2016 Barakat .................... G01K 3/04
(Continued)

OTHER PUBLICATIONS

Joseph Erbentraut, "Here's What the People Delivering Your Instacart Groceries Really Think", The Huffington Post, http://www.huffingtonpostin/entry/instacart-workers_n_6548822, captured Oct. 8, 2017, 4 pages.
(Continued)

*Primary Examiner* — Talia F Crawley

(57) ABSTRACT

Examples provide a system for cold-chain compliant item selection. A set of perishable items are selected for retrieval by a user based on item data, cold-chain compliance score(s), and/or cold-chain compliance restrictions associated with each user. The selected set of items are assigned to the user for retrieval in accordance with a set of cold-chain compliance parameters, including a per-item maximum dwell-time specifying a maximum time interval between removal of a perishable item from a temperature controlled display area and receipt of the perishable item at an intake area. A dwell-time is calculated for an item received at an intake area. The item is accepted if the per-item maximum dwell-time exceeds the calculated dwell-time and the item is rejected if the calculated dwell-time exceeds the per-item maximum dwell-time. An incentive is provided to the identified user based on a cold-chain compliance score for the user.

17 Claims, 17 Drawing Sheets

(51) Int. Cl.
*G06Q 10/08* (2012.01)
*G06Q 30/02* (2012.01)
*G06Q 30/06* (2012.01)

(56) References Cited

U.S. PATENT DOCUMENTS

| | | |
|---|---|---|
| 9,443,262 B1 | 9/2016 | Mamgain et al. |
| 2002/0004724 A1* | 1/2002 | Eastman ............ G06Q 30/0601 705/332 |
| 2007/0067177 A1* | 3/2007 | Martin ................. G09F 3/0288 340/584 |
| 2014/0222521 A1* | 8/2014 | Chait ................. G06Q 10/0637 705/7.36 |
| 2014/0279294 A1* | 9/2014 | Field-Darragh ..... H04B 5/0062 705/28 |
| 2014/0336814 A1* | 11/2014 | Moore ............... G06Q 10/0875 700/216 |
| 2016/0176635 A1* | 6/2016 | Varley .................... B65G 1/137 700/216 |
| 2017/0116572 A1* | 4/2017 | Natarajan ............ G06Q 20/202 |
| 2018/0195869 A1* | 7/2018 | High ........................ H04W 4/35 |
| 2019/0244214 A1* | 8/2019 | Flores .................. G06Q 20/407 |

OTHER PUBLICATIONS

Lora Kolodny, "Instacart's app has changed grocery stores for good", TechCrunch, https://techcrunch.com/2016/08/31/instacarts-app-has-changed-grocery-stores-for-good/, captured Oct. 8, 2017, 3 pages.

Unknown, "Get Paid to Deliver Groceries: Earn $25/hour Grocery Shopping", MoneyPantry, http://moneypantry.com/deliver-groceries-get-paid!, captured Oct. 8, 2017, 10 pages.

Unknown, "Logistics Trend Radar", DHL, Version 2016, 55 pages.

Unknown, "IBM Mobile First for iOS Pick & Pack", https://www.ibm.com/bs-en/marketplace/pick-and-pack-retail-ios-app/details, captured Jul. 18, 2017, 2 pages.

Courtney Reagan, "Wal-Mart employees can now deliver your online orders on their way home from work", http://www.cnbc.com/2017/06/01/wal-mart-employees-can-now-also-deliver-your-online-orders.html,captured Jul. 18, 2017, 2 pages.

* cited by examiner

SYSTEM FOR CROWDSOURCED COLD-CHAIN COMPLIANT ITEM SELECTION

BACKGROUND

It is sometimes more convenient for a user to order items from a store to be delivered to the user's residence or to be picked up by the user at a future day and/or time rather than travel to the store location and search for those items personally. These orders frequently include items which are stored in temperature controlled displays, such as refrigerated/chilled displays, freezers, and/or heated displays for maintaining temperature of items within a given range. For example, if ice cream is not stored within a certain range of cold temperatures, the ice cream melts. Likewise, precooked items, such as rotisserie chicken in a deli display, is maintained within a predetermined warm temperature range to prevent spoilage. However, when temperature-controlled items are being gathered for online order fulfillment, these items can be removed from the temperature-controlled environment by personal shoppers for unknown amounts of time. This can lead to loss, damage, or spoilage of these temperature sensitive items. Moreover, this type of order-fulfillment is frequently a time-consuming and cost-inefficient procedure for store personnel.

SUMMARY

Examples of the disclosure provide a system for cold-chain item retrieval in grocery order fulfillment. The system includes a memory and at least one processor communicatively coupled to the memory. A selection component selects a set of perishable items from a plurality of requested items for retrieval by an identified user within an item selection area based on a set of per-user restrictions assigned to the identified user. Any item in the plurality of requested items restricted by at least one restriction in the set of per-user restrictions is excluded from the selected set of perishable items. An assignment component assigns the selected set of perishable items to the identified user for retrieval in accordance with a set of cold-chain compliance parameters. The cold-chain compliance parameters include a per-item maximum dwell-time. The per-item maximum dwell-time specifies a maximum time interval between removal of a perishable item from an assigned temperature controlled display area and receipt of the perishable item at an intake area. A dwell-time monitor analyzes sensor data received from a plurality of sensor devices associated with an intake area. The dwell-time monitor calculates a dwell-time for each item in the selected set of perishable items assigned to the identified user received at an intake area based on the analysis of the sensor data. If the per-item maximum dwell-time exceeds the calculated dwell-time for the item, a cold-chain compliance component accepts an item in the set of perishable items retrieved by the identified user. The cold-chain compliance component rejects any item having a calculated dwell-time that exceeds the per-item maximum dwell-time indicting non-compliance with the cold-chain compliance parameters. An incentives generation component, implemented on the at least one processor, that generates an incentive for the identified user based on a cold-chain compliance score associated with the set of perishable items received at the intake area, the cold-chain compliance score indicating a level of compliance with the cold-chain compliance parameters.

Other examples provide a computer-implemented method for customized item retrieval in grocery order fulfillment. A set of perishable items from a plurality of requested items within a predetermined range of a location of a user device associated with an identified user is selected for retrieval by the identified user. Sensor data received from at least one sensor device associated with the intake area is analyzed. A dwell-time for each item in the set of assigned items is calculated based on an analysis of the sensor data. The dwell-time is an amount of time between removal of a perishable item from an assigned temperature controlled display area and receipt of the item at an intake area. Each item in the set of items delivered to the intake area having a per-item maximum dwell-time that exceeds the calculated dwell-time is accepted. The per-item maximum dwell-time is a maximum threshold time interval between removal of a perishable item from an assigned temperature controlled display area and receipt of the item at an intake area. Each item in the set of items delivered to the intake area having a calculated dwell-time that exceeds the per-item maximum dwell-time is rejected. A cold-chain compliance score is generated based on the number of accepted items delivered to the intake area and the number of rejected items. An incentive for the identified user is generated based on the cold-chain compliance score.

Still other examples provide a system for crowdsourced cold-chain compliant item retrieval associated with an item selection area. The system includes a memory; at least one processor communicatively coupled to the memory; and a data storage device storing a set of cold-chain compliance scores associated with each user in a plurality of users. A cold-chain compliance score indicates a degree of cold-chain compliance associated with previous sets of perishable items retrieved by a given user. A selection component selects a user from a set of users within the item selection area having a highest cold-chain compliance score to retrieve at least one perishable item. A communications interface component sends an assignment of the at least one perishable item with cold-chain compliance parameters to a user device associated with the selected user via a network connection. The cold-chain compliance parameters include a per-item maximum dwell-time for the at least one item. A dwell-time monitor calculates a dwell-time for the at least one perishable item based on sensor data received from at least one sensor device associated with an intake area. A cold-chain compliance component accepts the at least one perishable item if the per-item dwell-time exceeds the calculated dwell-time. The cold-chain compliance component rejects the at least one perishable item if the calculated dwell-time exceeds the per-item dwell-time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, examples of the disclosure enable crowdsourced cold-chain item selection for grocery order-fulfillment. In some examples, an item request fulfillment component selects a customized set of perishable items from a plurality of items for retrieval by a given user based on user-provided data, including user preferences, the user's available time for item retrieval, the user's cold-chain compliance score(s), and/or cold-chain item restrictions associated with the user. This enables assignment of items to users that prefer to retrieve those items while preventing items from being assigned to a user with a history of failure to comply with cold-chain compliance parameters. This further improves quality of retrieved items, improves cold-chain compliance and customer satisfaction.

In other examples, the request fulfillment component selects perishable items for retrieval by a given user based on per-user cold-chain compliance scores and/or per-user cold-chain compliance item restrictions. The scores and restrictions enable the system to assign items to users most capable of properly handling temperature sensitive items according to cold-chain compliance parameters. This improves the quality of items selected by users, improves accuracy of order-fulfillment, reduces resource expenditure and prevents item spoilage associated with item selection for fulfilling grocery orders.

Other examples provide a scoring component that rates cold-chain compliance based on feedback received from personnel and/or recipients of the perishable items selected by a given user rating quality of the selected items and condition of the perishable items when received from the identified user. The rating/score is used to disqualify certain users from selecting certain perishable items based on their ability to adhere to cold-chain compliance rules, safely handle temperature sensitive items, and deliver perishable items to an item intake area in acceptable condition. This improves safe-handling of temperature sensitive items, compliance with cold-chain parameters, and further improves perishable item selection quality while reducing labor expenditure in order-fulfillment.

Figure 1:
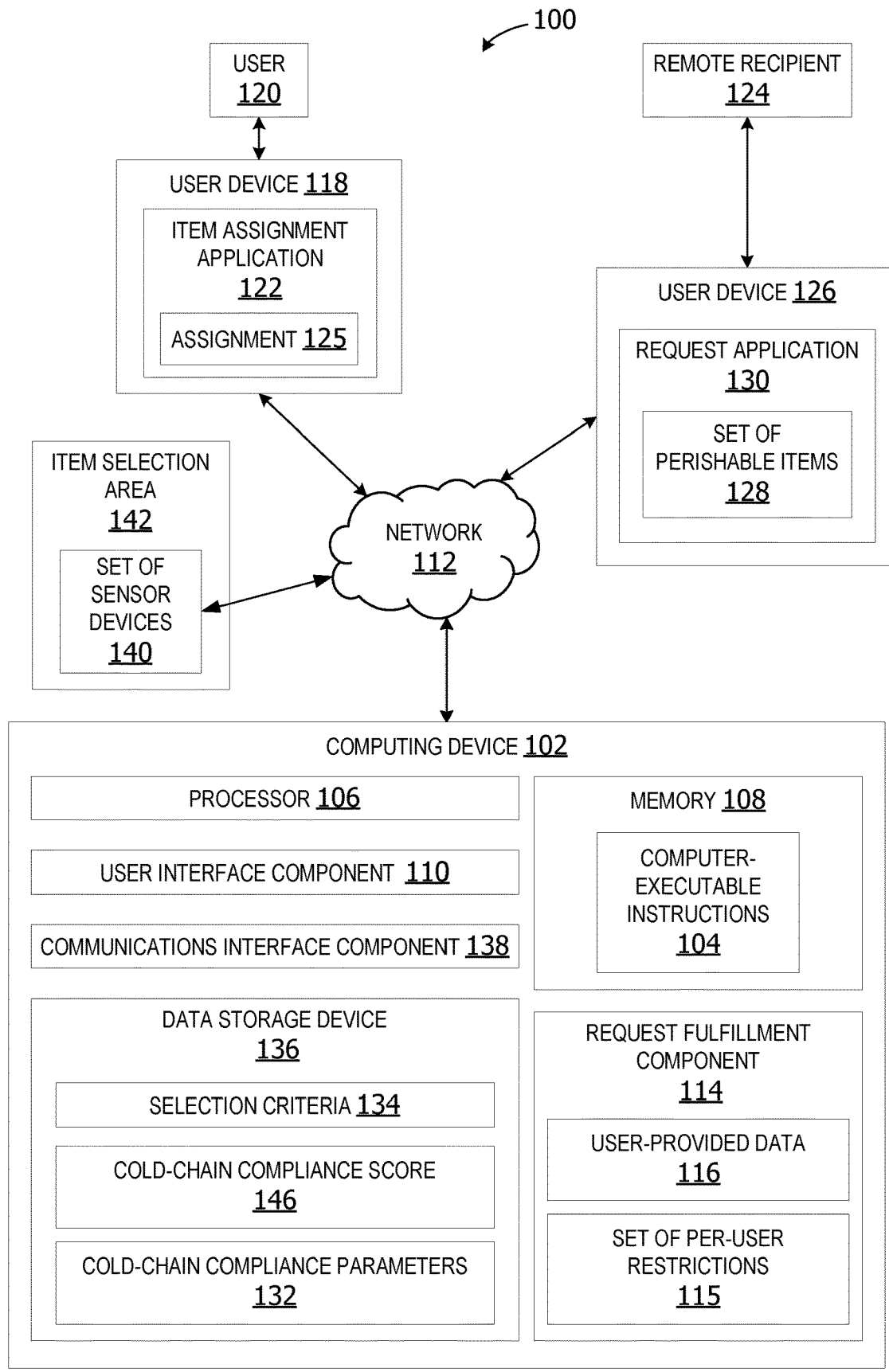
FIG. 1 is an exemplary block diagram illustrating a system for crowdsourced cold-chain item retrieval for order-fulfillment.

Referring again to FIG. 1, an exemplary block diagram illustrates a system 100 for crowdsourced cold-chain item retrieval for order-fulfillment. In the example of FIG. 1, the computing device 102 represents any device executing computer-executable instructions 104 (e.g., as application programs, operating system functionality, or both) to implement the operations and functionality associated with the computing device 102. In this non-limiting example, the computing device 102 is implemented as a server. In other examples, the computing device 102 includes a mobile computing device or any other portable device. In some examples, the computing device 102 includes a mobile telephone, laptop, tablet, computing pad, netbook, gaming device, and/or portable media player. The computing device 102 can also include a desktop personal computer, kiosk, back-end server, tabletop device, or industrial control device. Additionally, the computing device 102 can represent a group of processing units or other computing devices.

In some examples, the computing device 102 has at least one processor 106, a memory 108, and at least one user interface component 110. The processor 106 includes any quantity of processing units, and is programmed to execute computer-executable instructions 104. The instructions can be performed by the processor 106 or by multiple processors within the computing device 102. The instructions can also be performed by a processor external to the computing device 102. In some examples, the processor 106 is programmed to execute computer-executable instructions 104 such as those illustrated in the figures (e.g., FIG. 15, FIG. 16, FIG. 17, FIG. 18, and FIG. 19).

The computing device 102 further has one or more computer readable media, such as the memory 108. The memory 108 includes any quantity of media associated with or accessible by the computing device 102. The memory 108 can be internal to the computing device 102 (as shown in FIG. 1), external to the computing device (not shown), or both (not shown). In some examples, the memory 108 includes read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

The network 112 is implemented by one or more physical network components, such as, but without limitation, routers, switches, network interface cards (NICs), and other network devices. The network 112 can be any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

The memory 108 further stores one or more computer-executable components. Exemplary components include an item retrieval request fulfillment component 114. The request fulfillment component 114, when executed by the processor 106 of the computing device 102, causes the processor 106 to receive user-provided data 116 from a user device 118 associated with an identified user 120 within an item selection area 142.

The item selection area 142 is an area in a retail environment including a plurality of items being stored or displayed for selection by one or more users within the item selection area 142. The item selection area 142 can include an interior area of a store, an exterior area of a store, a department, aisle display, end cap display, tent area in a parking lot, racks or displays in front of the store, racks or displays on a sidewalk or any other area for storing or displaying items prior to selection/pickup by a user.

The item selection area 142 in this non-limiting example is a store, such as a grocery store. The item selection area 142 in some examples includes, without limitation, a produce department, frozen foods section, dairy department, meat department, fish/seafood department, bakery, can goods department, dry goods department and/or any other department, area or center within a store.

The item selection area 142 in this example includes one or more temperature-controlled display areas storing one or more perishable items, such as refrigerated display areas, freezer display areas, and/or heated display areas. The item selection area 142 can also include gondola shelves, side-counters, storage bins, wall-mounted shelves, end-cap displays, aisle displays, as well as any other type of shelf, bin, container, cabinet, counter, rack, shelving unit, or other device for storing and/or displaying items.

The user-provided data 116 is data input by the user 120. The user-provided data 116 in some examples includes a user-provided list of items, such as, but not limited to, the user-provided list of items 214 in FIG. 2 and/or FIG. 3. A user-provided list of items is a set of one or more items to be obtained by the user within the item selection area 142 for the user and not for a remote recipient 124.

The user-provided data 116 in other examples includes an amount of time available for item retrieval. The amount of time available for item retrieval is an estimated amount of time the user 120 is available to pick-up perishable items or deliver items to an intake area in the item selection area, such as, but not limited to, the available time 1104 in FIG. 11.

The request fulfillment component 114 in some examples selects a set of one or more perishable items 128 from a plurality of requested items. The set of perishable items 128 includes items selected for retrieval by the identified user 120. In some examples, each item in the selected set of perishable items corresponds to at least one item on the user-provided list of items. In other examples, each item in the selected set of perishable items has a predetermined retrieval time that is less than the user's estimated amount of time available for item retrieval.

The request fulfillment component 114 outputs the one or more requested items assigned to the user 120 to an item assignment application 122 running on the user device 118. The user device 118 is a computing device associated with the user 120. The user device 118 can include a mobile computing device or any other portable device. In some examples, the user device 118 includes a mobile telephone, laptop, tablet, computing pad, netbook, gaming device, and/or portable media player.

The user device 118 in some examples downloads the item assignment application 122 from the computing device 102 via the network 112. In other examples, the user device 118 downloads the item assignment application from an application server, a cloud server, or any other computing device via any network connection.

The item assignment application 122, in some examples, sends the user-provided data 116 to the computing device 102 and receives an assignment 125 of one or more perishable items to be retrieved on behalf of one or more remote recipients, such as the remote recipient 124. The remote recipient 124 is a user not physically present in the item selection area 142. The remote recipient 124 is a user that has ordered one or more items online or via another remote ordering system, such as by telephone.

The request fulfillment component 114 analyzes the user-provided data 116 with selection criteria 134 to identify one or more items to assign to the user 120 for retrieval by the user 120. The item assignment application 122 in other examples provides a notification for each item assigned to the user for retrieval by the user within a retrieval time associated with each item. The retrieval time is the maximum amount of time from a time the item is assigned to the user until the user delivers the item to an intake area. The item assignment application 122 provides an alarm or alert in the application that notifies the identified user 120 that the assigned retrieval time is about to expire. The notification includes the retrieval time, an indication of how much time remains prior to the expiration of the retrieval time, a location of the item associated with the retrieval time that is about to expire, and/or a location of a nearest item intake area inside the item selection area 142 where the item should be delivered prior to expiration of the retrieval time.

The item assignment application 122 in other examples provides a notification for each item assigned to the user for retrieval by the user and cold-chain compliance parameters 132 associated with each perishable item in the set of perishable items 128 assigned to the user. The cold-chain compliance parameters 132 is a set of one or more rules specifying handling of temperature sensitive items, such as meats, dairy items, frozen food items, ice cream, deli items, pre-cooked food items, and other perishable items. The cold-chain compliance parameters 132 include a maximum dwell-time for each perishable item. The maximum dwell-time is the maximum amount of time an item remains outside a temperature-controlled area. In other words, the maximum dwell-time is the maximum amount of time from the time an item is removed from a temperature controlled display area and the time the item is delivered to another temperature controlled area in the item intake area. The maximum dwell-time is different from the item retrieval time in that the retrieval time is concerned with how long it takes to deliver an item to the intake area after assignment of the item to the user. The dwell-time is concerned with how long an item is exposed to ambient temperatures outside a temperature controlled area.

In some examples, the user 120 scans a perishable item with a hand-held scanner or with the user device 118 when the perishable item is removed from a temperature controlled area. The item assignment application 122 analyzes the scanner data to identify a time of removal from the temperature controlled area. This enables the item assignment application 122 and/or the request fulfillment component 114 to monitor the dwell-time for the item.

The item assignment application 122 in some examples provides an alarm or alert in the application that notifies the identified user 120 that the maximum dwell-time is about to expire. The notification alerts the user that cold-chain compliance is close to being compromised before item drop-off at an intake area. The notification can include the maximum dwell-time, an indication of how much time remains prior to the expiration of the maximum dwell-time, and/or a location of a nearest item intake area having a temperature-controlled area. The intake area is an area for receipt of temperature-sensitive items where the user 120 can deliver the item prior to expiration of the maximum dwell-time to ensure cold-chain compliance.

In some examples, the request fulfillment component 114 uses sensor data and/or the user-provided list of items (shopping list) to determine the user's current location and/or identify areas within the item selection area 142 the user plans to visit while shopping. The request fulfillment component 114 uses the sensor data and user-provided list of items to identify perishable items located within a proximity to the identified user for assignment to the user and/or identify a nearest intake area for drop-off of selected items by the user 120.

The sensor data is generated by a set of one or more sensor devices 140 associated with the item selection area 142. The set of sensor devices 140 can include one or more proximity sensor(s), one or more scanner(s), one or more image capture device(s), one or more pressure sensor(s), one or more weight sensor(s), one or more beacon transmitter(s), one or more beacon receiver(s), or any other type of sensor devices. The image capture devices include one or more cameras, infrared imaging devices, or any other type of device for image capture. The scanners can include radio frequency identifier (RFID) tag readers, barcode readers, hand-held scanners, mounted scanners, matric barcode readers, or any other type of scanner.

The set of sensor devices 140 in some examples includes one or more sensors associated with the item selection area 142. In other examples, the set of sensor devices 140 includes one or more sensors associated with one or more intake areas. However, some of the sensor devices can be associated with shelves, aisles, an entrance/exit, ceiling, kiosk, or other areas of the item selection area 142 not limited to the intake area(s).

In some examples, the remote recipient 124 is a user ordering one or more items via a request application. The remote recipient downloads the request application 130 from the computing device 102, an application server, a cloud server, or other provider of the request application 130. The request application 130 enables the remote recipient 124 to remotely send a request to order the set of perishable items 128 to the computing device 102. The set of perishable items 128 is a set of one or more items requested by the remote recipient 124 for delivery to the remote recipient 124 or pick-up by the remote recipient 124 at a future date and/or time.

The selection criteria 134 is a set of one or more rules for selecting one or more items to be assigned to a given user for retrieval by the given user. The selection criteria 134 can specify that a given user only retrieve non-food items. In another example, the selection criteria 134 specifies that a user can only retrieve an item if the estimated retrieval time for that item is less than the user's estimated time available for retrieving items.

The request fulfillment component 114 sends the assigned items selected for retrieval by the user 120 to the user device 118 with retrieval criteria, including cold-chain compliance parameters 132. The retrieval criteria are a set of one or more rules for retrieving items. In an example, retrieval criteria specifies that the user 120 place items being retrieved for a remote recipient 124 in a separate basket or a different cart than any items the user 120 is selecting for purchase by the user 120 for the user's own use.

The cold-chain compliance parameters 132 is a set of one or more rules governing handling of temperature-sensitive items. The cold-chain compliance parameters 132 can specify that ice cream or other cold items should not be placed near hot items, such as pre-cooked deli food items. The cold-chain compliance parameters 132 also include the maximum dwell-time for each item. Cold-chain compliance parameters can include other rules or suggestions for perishable items, such as, but not limited to, suggestions to keep hot items separated from cold items in a basket or cart, instructions to pick-up cold items last or immediately prior to delivering items to an intake area, instructions to pick up all cold items at the same time, instructions to pick up all hot/warm items at the same time, etc.

In some example, the user device 118 associated with the user includes a scanner for scanning a barcode or other identifier associated with each item. The user scans the barcode or identifier associated with each perishable item the user selects as the user places the item in the cart. The item assignment application 122 verifies the user has selected the correct assigned items in compliance with the retrieval criteria. The request fulfillment component 114 and/or the item assignment application generates a removal time for each perishable item based on the scanner data generated when the user scans items as they are placed in the basket or cart. The removal time is the time when the perishable item is removed from a temperature controlled area.

In other examples, the retrieval criteria specify a maximum retrieval time for one or more items. For example, if the remote recipient 124 indicated a desire to pick-up the set of perishable items 128 in one-hour, the retrieval criteria can specify that the user 120 select the assigned item(s) and deliver them to an intake area within a retrieval time that is less than one-hour to ensure items in the set of perishable items 128 are ready for pick-up by the remote recipient 124 on-time.

The user 120 selects one or more of the items in the set of perishable items 128 assigned to the user 120. The user 120 delivers the requested items selected by the user 120 to an item intake area in the store, such as the intake area 220 in FIG. 2, for at least partial fulfillment of at least one order received from at least one remote recipient, such as the remote recipient 124. The request fulfillment component 114 provides an incentive to the user 120 as a reward for selecting the items requested by the remote recipient 124 in accordance with the cold-chain compliance parameters 132.

In some examples, the selection criteria 134, the cold-chain compliance parameters 132, cold-chain compliance score 146, and/or other data is stored locally on a data storage device 136. The data storage device 136 can include a set of one or more data storage devices storing data. The data storage device 136 can be implemented as one or more types of data storage devices, such as, for example, one or more rotating disks drives, one or more solid state drives (SSDs), and/or any other type of data storage device. The data storage device 136 in some non-limiting examples includes a redundant array of independent disks (RAID) array. In other examples, the data storage device 136 includes a database, such as, but not limited to, the database 714 in FIG. 7 below.

The set of perishable items 128 in some examples is received from one or more user devices associated with one or more remote recipients via a communications interface component 138. Likewise, the one or more items assigned to the user 120 can be output to the user device 118 via the communications interface component 138.

In some examples, the communications interface component 138 includes a network interface card and/or computer-executable instructions (e.g., a driver) for operating the network interface card. Communication between the computing device 102, the user device 118, the user device 126, and/or other devices can occur using any protocol or mechanism over any wired or wireless connection. In some examples, the communications interface component 138 is operable with short range communication technologies such as by using near-field communication (NFC) tags.

In this example, the user 120 sends the user-provided data 116 to the computing device 102 and/or receives notification of assigned items for retrieval by the user 120 using a separate user device 118 connected to the computing device 102 via the network 112. However, in other examples, the user 120 provides the user-provided data 116 directly to the computing device 102 via the user interface component 110. In an example, the computing device 102 includes a kiosk providing the user interface for entering the user-provided data and receiving assigned item(s) for retrieval.

In some examples, the user interface component 110 and/or any other input/output device can be provided to output the assigned item(s) for retrieval to the user 120. In an example, a list of one or more items to be retrieved by the user and the cold-chain compliance parameters 132 is printed out to the user on a printer device associated with the computing device 102 or kiosk.

The user interface component 110 component includes a graphics card for displaying data to the user and receiving data from the user. The user interface component 110 component can also include computer-executable instructions (e.g., a driver) for operating the graphics card. Further, the user interface component 110 component can include a display (e.g., a touch screen display or natural user interface component 110) and/or computer-executable instructions (e.g., a driver) for operating the display. The user interface component 110 component can also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. In a non-limiting example, the user inputs commands or manipulate data by moving the computing device 102 in a particular way.

In some examples, the user interface component 110 receives the user-provided data 116 entered manually by a user. The user-provided data 116 can include the user-provided list of items and/or an amount of time available for retrieving items. In other examples, the user-provided data 116 is received from the user device 118 via the network 112.

In one non-limiting example, the user 120 logs-in to the system 100 via the item assignment application 122 running on the user device 118 or via the user interface component associated with a kiosk or other computing device, such as computing device 102 associated with the item selection area 142. The user enters the amount of time the user has available for item retrieval and/or a user-provided list of items if the user intends to make a purchase. The user can not have a user-provided list of items if the user is waiting for a service, such as eye glasses, auto services, pharmacy service, or other service. The request fulfillment component 114 outputs the set of perishable items 128 with the cold-chain compliance parameters 132 to the user via the user device 118 or via the user interface component 110. In other examples, the set of perishable items 128 assigned to the user and the cold-chain compliance parameters 132 can be printed out in a hardcopy form via a printer device. The output list of items for retrieval can include a printed bar code corresponding to each assigned item for retrieval. The user can scan the barcode on the list as the user picks up each item to ensure the correct item is retrieved. The barcodes can be provided on a printout list of the item or on a digital list provided via a user interface on the user device 118.

If the user accepts the offered items for retrieval subject to the retrieval criteria, the set of perishable items 128 are assigned to the user for retrieval on behalf of one or more other remote users that are not physically present in the item selection area 142. The user 120 retrieves those items and drops them off at an intake area or other drop-off location. An order-filler checks the items for quality control and packs the items for the one or more remote users. The request fulfillment component 114 assigns an incentive to the user as a reward for retrieving requested items accurately and/or with positive feedback.

In some examples, the request fulfillment component 114 selects each item in the set of perishable items 128 from a plurality of requested items for retrieval by an identified user 120 within the item selection area 142. The set of perishable items 128 is selected based on a set of per-user restrictions 115 assigned to the identified user 120. The set of per-user restrictions 115 is a set of one or more restrictions assigned to the user 120. A restriction is a prohibition preventing assignment of perishable items or cold-chain compliance items to the user 120 based on a level of compliance with cold-chain compliance parameters for previous items retrieved by the user 120 on previous visits to the item selection area 142. Any item in the plurality of requested items that is restricted by at least one restriction in the set of per-user restrictions 115 is excluded from the selected set of perishable items 128 assigned to the user 120.

The request fulfillment component 114 assigns the selected set of perishable items 128 to the identified user 120 for retrieval in accordance with a set of cold-chain compliance parameters 132, including a per-item maximum dwell-time for each item in the set of perishable items 128. The per-item maximum dwell-time specifies a maximum time interval between removal of a perishable item from an assigned temperature controlled display area and receipt of the perishable item at an intake area.

Figure 2:
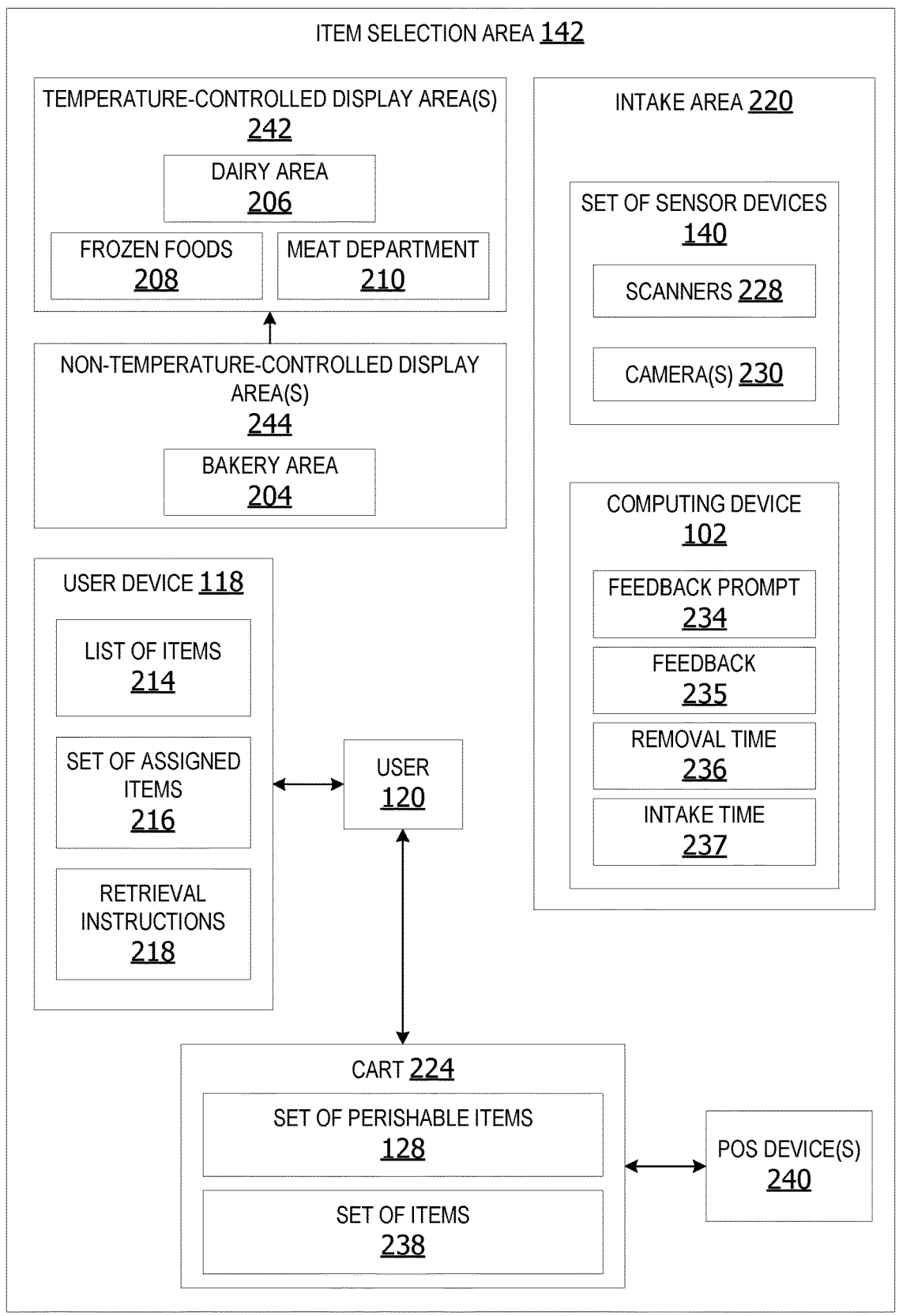
FIG. 2 is an exemplary block diagram illustrating an item selection area.

FIG. 2 is an exemplary block diagram illustrating an item selection area 142. The item selection area 142 is an area including a plurality of items on display for selection by one or more users within the area. The item selection area 142 can include an interior area of a store, an exterior area of a store, or any other portion of an item display environment. The item selection area 142 in some examples is a public or semi-public area in which customers shop for one or more items in a plurality of items 202. The plurality of items 202 can include any type of items, such as, but not limited to, comestibles (food items), pet supplies, tools, clothing items, sports equipment, craft supplies, games, toys, electronic items, and/or any other types of items.

The item selection area 142 can be sub-divided into one or more other areas based on a type or category of items found in each sub-divided area. For example, the item selection area 142 can include non-temperature-controlled display area(s) 244, such as a bakery area 204 for bread and other bakery items. The item selection area 142 can also include one or more temperature-controlled display area(s) 242, such as, but not limited to, a dairy area 206 for milk and other dairy-related items, a frozen foods 208 area for frozen food items, a meat department 210 for meat-related items, and/or any other sub-divided areas for other categories of items. The temperature-controlled display area(s) 242 can include refrigerated areas storing cold items, freezer areas for storing frozen items, and/or heated areas for storing warm or hot items, such as cooked chicken, cooked hot dogs, or other hot/warm items.

In some examples, a user-provided list of items 214 is utilized to select perishable items for retrieval by the user. The user-provided list of items 214 is a list of one or more items the user 120 plans to obtain from the item selection area 142. An item in the user-provided list of items 214 is an item for the user 120 and not an item for a remote recipient or fulfillment of an order for a third party. The user-provided list of items 214 in some examples include a shopping list.

The user-provided list of items 214 can be provided to the request fulfillment component manually via a kiosk or the user can upload the user-provided list of items 214 via an item assignment application running on a user device 118 associated with the user 120, such as, but not limited to, the item assignment application 122 in FIG. 1. The user device is a portable computing device, such as, but not limited to, the user device 118 in FIG. 1.

The user 120 receives a set of one or more assigned items 216 for retrieval by the user and delivery to an intake area 220. In some examples, the items are assigned to users in a first-in and first-out (FIFO) order. In other examples, the items are assigned in accordance with a user-selected pick-up time, such that items for orders to be picked up earlier are assigned first and items for orders to be picked up later are assigned last.

The intake area is an area within the item selection area 142 in which the user can drop-off items the user has retrieved. The intake area 220 is a location at which items are scanned and sorted into orders for delivery or pick-up by remote recipients. The intake areas include temperature controlled areas for receiving perishable items. The temperature-controlled areas can include heated areas, refrigerated areas, and freezer areas. Intake areas can be located at various locations within the item selection area 142 of a store or other item selection area.

The user 120 can optionally also receive retrieval instructions 218 associated with the assigned items 216. The retrieval instructions 218 can include retrieval criteria specifying a maximum amount of time for retrieving one or more of the items in the assigned items 216 and/or cold-chain compliance parameters, such as the cold-chain compliance parameters 132 in FIG. 1.

The retrieval instructions 218 can include a maximum amount of time for retrieving each item, in which each item has a different maximum retrieval time. The retrieval time in other examples is the same retrieval time for all the items assigned to the user. In still other examples, the retrieval instructions also include directions and/or a map indicating a location of each item in the list of items.

If the user agrees to accept the assigned items 216 in accordance with the retrieval instructions, including the cold-chain compliance parameters, the items are assigned to the user. The user selects items conforming to the assigned items 216 and delivers those items to the intake area 220. The set of perishable items 128 received at the intake area 220 includes the one or more items delivered to the intake area 220 by the user 120. The intake area 220 can be a single intake area within the item selection area 142, as well as two or more different intake areas located at two or more different locations within the item selection area 142.

In other examples, the intake area 220 is located within a proximity or threshold distance to the item selection area 142, such as near an entrance or exit point of the item selection area or in an adjacent area. A set of sensor devices 140 generates sensor data associated with each item in the set of perishable items 128 delivered to the intake area 220. The sensor data is analyzed to verify item identification and time of drop-off at the intake area. This data is used to verify order fulfillment by the user.

In some examples, the set of sensor devices 140 includes one or more hand-held scanners for a user to manually scan each item dropped off at the intake area 220. In other examples, the set of sensor devices 140 includes one or more automatic scanning devices for automatically scanning items dropped off at the intake area 220. The automatic scanning devices optionally include a smart conveyor that scans and sorts items into orders/totes to verify and complete order. Any items not conforming to a perishable item assigned to the user is rejected and returned to an assigned display area for the item or a storage area for the item. Likewise, any item delivered to any intake area 220 failing to conform to the cold-chain compliance parameters is rejected. However, in some examples, items which are rejected due to the dwell-time exceeding the maximum dwell-time are not returned to the display areas. Instead, the items are designated for disposal due to failure to adhere with cold-chain compliance parameters.

The request fulfillment component in other examples analyzes sensor data generated by the set of sensor devices 140 to determine whether each item in the set of perishable items 128 conforms to the assigned items 216 and the retrieval instructions 218, including the cold-chain compliance parameters. Each item in the set of perishable items 128 that conforms to the assigned items 216 and the retrieval instructions 218 are accepted by the request fulfillment component. If an item in the set of perishable items 128 fails to match an item in the assigned items 216 and/or an item is not retrieved in accordance with retrieval instructions 218, the request fulfillment component rejects the item. Items delivered to the intake area that are rejected due to failure to adhere to cold-chain compliance parameters, such as the maximum dwell-time are not returned to display areas. Instead, these items are designated for disposal if the items were exposed to ambient temperatures for a time-period exceeding the maximum dwell-time.

In some examples, items received at the intake area 220 that are rejected by the system are added back into the plurality of requested items for assignment to another user. In other words, if a first user retrieves an item which does not conform to quality standards and/or other retrieval criteria, the rejected item is assigned to another user for retrieval. If insufficient time remains, an associate or other order-filler personnel can be assigned to retrieve the rejected item.

The set of sensor devices 140 is a set of one or more sensor devices for identifying an item delivered to the intake area 220, identifying a time of delivery of an item to the intake area 220, and/or evaluating a quality of an item delivered to the intake area 220. The set of sensor devices 140 in some examples include one or more scanners 228. A scanner can be implemented as a radio frequency identifier (RFID) tag reader, a barcode reader, a universal product code (UPC) reader, a matrix barcode reader, a beacon receiver, or any other type of scanner device. A scanner in the one or more scanners 228 can include a hand-held scanner, as well as a mounted scanner.

The set of sensor devices 140 can also include one or more image capture devise, such as, but not limited to, one or more camera(s) 230. Image data generated by the camera(s) 230 is analyzed by the request fulfillment component running on the computing device 102 to identify items and/or determine a quality of the items. For example, image data can be analyzed to identify items that are damaged, have ripped packaging, smashed packaging/smashed contents of packaging, or otherwise poor quality.

The computing device 102 in these examples analyzes the sensor data generated by the set of sensor devices 140 to identify the items retrieved by the user 120. In other examples, the computing device 102 sends the sensor data to a remote server which analyzes the sensor data to identify quality and accuracy of the items retrieved by the user 120.

In other examples, intake area 220 includes a computing device 102 associated with one or more order-fillers preparing orders for one or more recipients of one or more items in the set of items retrieved by the user 120. The computing device 102 can output a feedback prompt 234 to the one or more order-fillers requesting feedback 235 from the order-filler(s) associated with the accuracy and quality of items retrieved by the user 120.

The computing device 102 in other examples analyzes sensor data generated by the set of sensor devices 140 to determine a removal time 236 when a perishable item is removed from a temperature-controlled area. The computing device 102 also analyzes sensor data to identify an intake time 237 when the perishable item is received at an intake area and returned to another temperature-controlled area. The removal time 236 and the intake time 237 are used to determine the actual dwell-time. The actual dwell-time is the amount of time an item is exposed to ambient temperature outside a temperature controlled area.

In some examples, the user 120 also selects a set of one or more items 238 for the user 120 to purchase/keep on behalf of the user 120 rather than on behalf of someone else. The set of items 238 includes items selected by the user 120 for purchase by the user 120. The user can purchase the set of items 238 via a transaction completed at one or more point-of-sale (POS) devices 240. In other examples, the user 120 completes a transaction associated with purchase of the set of items 238 via an application running on the user device 118.

In some examples, the user retrieves the one or more items from the item selection area 142 using a cart 224, basket, shopping bag, or other container for transporting the items. The cart 224 is any type of shopping cart or basket on wheels in this non-limiting example. The user can keep the set of items 238 for the user to keep in one area of the cart 224 and the set of retrieved items to be delivered to the intake area 220 in a separate area of the cart 224. In other examples, the user has a first cart for the set of items 238 the user intends to purchase and a second cart for the set of perishable items 128 for delivery to the intake area 220.

In some examples, the intake area receives one or more items retrieved by the user. One or more sensor devices associated with the intake area scans the one or more received items to identify the items and/or determine whether the one or more items conform to one or more requested items for partial order fulfillment. The sensor data generated by the one or more sensor devices is analyzes for the item identification and/or analysis of the item quality for assortment and order-filling.

Figure 3:
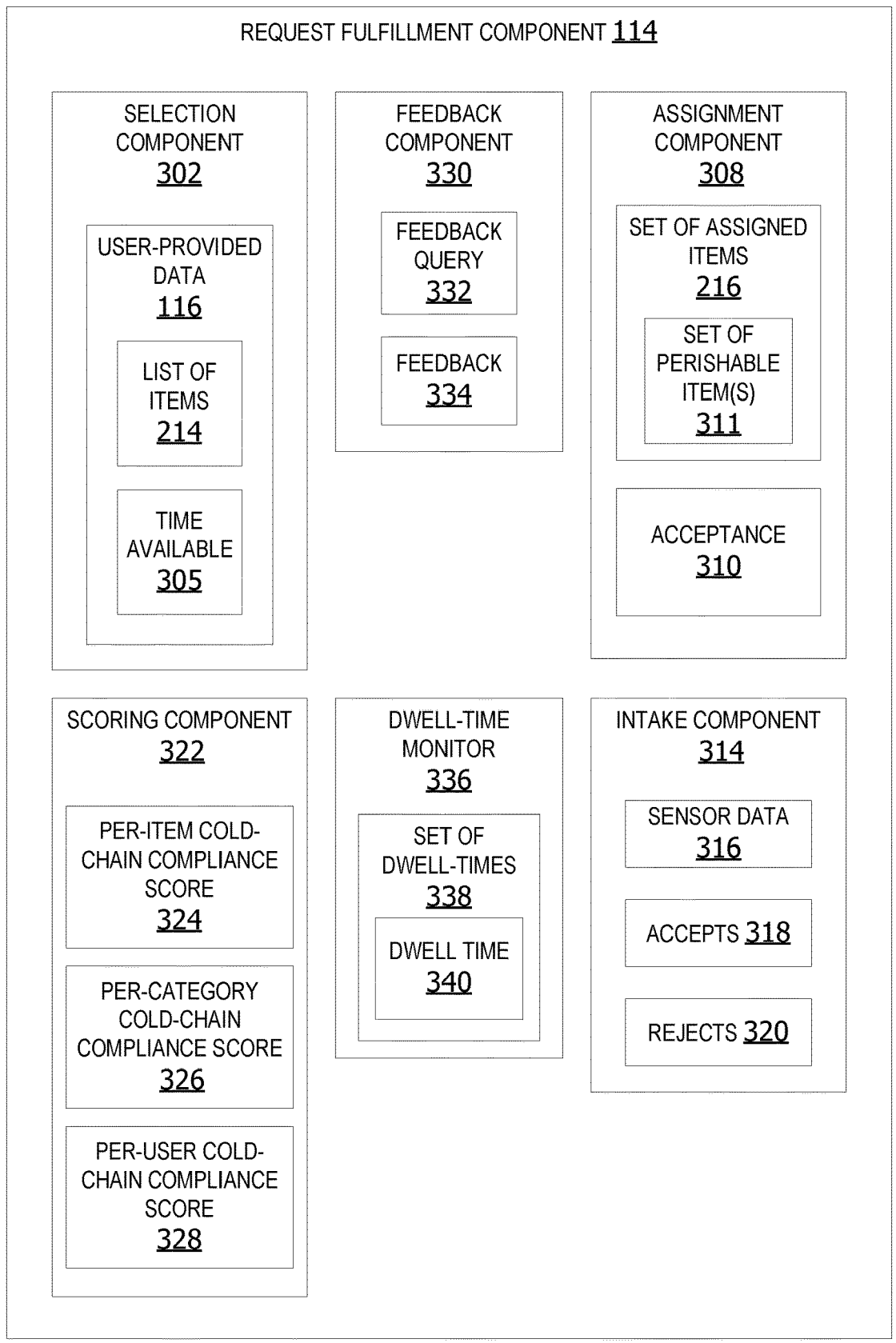
FIG. 3 is an exemplary block diagram illustrating a request fulfillment component.

FIG. 3 is an exemplary block diagram of a request fulfillment component 114. In some examples, the request fulfillment component 114 includes a selection component 302. The selection component 302 selects a set of one or more perishable items 128 from a plurality of requested items for retrieval by an identified user within an item selection area, such as the user 120 in FIG. 1 and/or FIG. 2. In this non-limiting example, the item selection area is an area in a retail environment, such as, but not limited to, the item selection area 142 in FIG. 1 and FIG. 2.

In some examples, the selection component 302 analyzes user-provided data 116 with the selection criteria to select one or more items from the plurality of requested items for retrieval by a particular user. In other words, the items selected for retrieval by the user are customized for each user based on the user-provided data 116. The user-provided data 116 includes an amount of time available 305 for retrieving the set of perishable items 128 from the item selection area. The selection component 302 compares the user-provided time available 305 with the retrieval time for each item and only assigns items to the user that are capable of retrieval in the time available 305 indicated by the user. The retrieval time can be a per-item time or a retrieval time for all the items in the list of items.

In some examples, the user-provided data 116 includes a list of items 214 for the user provided by the user. In these examples, the selection component 302 selects items for retrieval that match or correspond to one or more items on the list of items 214 provided by the identified user in the user-provided data 116. The list of items 214 is a list of one or more items the user plans to select for purchase and/or user by the user.

In other examples, the user-provided data 116 includes user preferences, such as the user preferences in the set of user preferences 736 in FIG. 7 below. The user preferences indicate items the user prefers to retrieve for remote recipients and/or items the user prefers not to retrieve for remote recipients. Items the user prefers not to retrieve can be referred to as negative preferences. For example, if a user is a vegan, the user preferences can indicate the user prefers not to retrieve meat or other animal products.

In some example, the list of items is output to the user with an accept or reject query asking the user to indicate which items the user agrees to retrieve within the retrieval time allotted for item retrieval. The user can accept all the items in the list, accept none of the items in the list, or accept one or more of the items. The user can likewise reject all the items, none of the items, as well as reject one or more of the items.

An assignment component 308 assigns at least one item in the set of requested items to the identified user with retrieval criteria associated with the at least one item in response to receiving an acceptance 310 of the at least one item by the identified user. If a user rejects one or more of the items in the set of requested items, the rejected item is removed from the set of items to be assigned to the user. The set of one or more assigned items 216 accepted by the user is assigned to the identified user. The assigned set of items is output to the user via a user interface component or via a user device associated with the user.

The assignment component 308 removes items assigned to a user for retrieval from the plurality of requested items to prevent assignment of the same item to two or more users. In other examples, when an item is assigned to a user for retrieval, the assignment component adds a marker or identifier to the item in the plurality of requested items indicating that retrieval of the is in progress but has not yet been received at an intake area. This prevents retrieval of duplicate/unnecessary items.

An intake component 314 analyzes sensor data 316 associated with one or more retrieved items received at an intake area to determine whether the retrieved item(s) corresponding to one or more items in the set of assigned items 216. The intake component 314 accepts 318 each item retrieved by the user and delivered to the intake area that conforms to an item identified in the set of assigned items 216 and cold-chain compliance parameters for each item. The intake component 314 rejects 320 each item retrieved by the user and delivered to the intake area that fails to conform to an item identified in the set of assigned items 216 and/or fails to conform with cold-chain compliance rules, such as the cold-chain compliance parameters 132 in FIG. 1.

A scoring component 322 generates a cold-chain compliance score for the identified user based a level of compliance with the cold-chain compliance parameters for each item in the set of assigned items 216 that were correctly retrieved and delivered to the intake area within the assigned retrieval time.

The scoring component 322 in some examples calculates the cold-chain compliance score based on compliance with cold-chain parameters, including the maximum per-item dwell-time and/or a quality of items retrieved by the user. The quality refers to whether an item arrives at an intake area in an expected condition. For example, if ice cream is delivered to the intake area melted the quality is poor. Likewise, if a pre-cooked deli chicken is delivered to the intake area at room temperature (no longer hot) the quality is poor. Likewise, if frozen foods are received at the intake area already partially defrosted, the quality is poor.

In some examples, the cold-chain compliance score is a per-item cold-chain compliance score 324 indicating a cold-chain compliance ranking for a specific item. For example, the scoring component 322 can generate a cold-chain compliance score for ice cream and another cold-chain compliance score for frozen pizza. The user can have an acceptable cold-chain compliance score for the frozen pizza but a poor/unacceptable score for the ice cream if the user delivered still frozen pizza to the intake area but also brought partially melted ice cream.

The scoring component 322 in other examples generates a per-category cold-chain compliance score 326 for a user. For example, if the user retrieves frozen foods that are melted or partially defrosted on two or more occasions, the scoring component 322 can generate a per-category cold-chain compliance score 326 that is low (outside an acceptable range) indicating the user should not be assigned any additional frozen food items for retrieval due to poor frozen item quality. However, if the user consistently retrieves milk, butter, yogurt, and other dairy items that are compliant with cold-chain parameters, the per-category cold-chain compliance score 326 for dairy items assigned to the user can be a higher score (within an acceptable score threshold range).

In still other examples, the scoring component 322 generates a per-user cold-chain compliance score 328. The per-user cold-chain compliance score 328 is an overall item score for all items retrieved by the user on one or more occasions. The per-user cold-chain compliance score 328 indicates general adherence with cold-chain compliance parameters. In other words, the per-user cold-chain compliance score 328 indicates whether a user typically retrieves the correct item within the designated maximum dwell-time and the items arrive at the intake area in good/acceptable condition.

A feedback component 330 in some examples sends a feedback query 332 to a user device associated with a remote recipient receiving one or more items retrieved by a given user and/or a user device associated with an order-filler preparing an order for at least one recipient that includes at least one item in the set of retrieved items retrieved by the identified user. The scoring component 322 generates the cold-chain compliance score(s) for a user based on the feedback 235 received by the feedback component 330.

In some examples, the feedback 235 received from the recipient(s) and/or the order-filler includes feedback 235 indicating quality/condition of the at least one item retrieved by the identified user. In other examples, the feedback 235 indicates accuracy of the items retrieved. In other words, if the requested item was for two half-gallon cartons of whole milk and the user retrieved one gallon of whole milk, the retrieved item is not the correct size or number of items. In this case, negative feedback can be received indicating the items retrieved were not the same as the items assigned to the user for retrieval.

The feedback 235 in some examples includes rating or indication of quality and/or condition of items selected. For example, if a user selects ice cream bars that are smashed or a milk jug that is leaking milk, the feedback 235 will include negative feedback with a poor/negative rating. If the user selects butter in an undamaged container that is not melted, the user will receive positive feedback 235 with a positive rating.

A dwell-time monitor 336 calculates a set of dwell-times 338 for one or more items. The set of dwell-times 338 is a set of one or more dwell-times for each item in the selected set of perishable items assigned to the identified user that is received at an intake area based on an analysis of sensor data 316 received from at least one sensor device associated with the intake area. In some examples, the intake component 314 accepts an item in the set of perishable items retrieved by the identified user if the per-item maximum dwell-time for the item exceeds the calculated dwell-time for the item. The intake component 314 rejects any item having a calculated dwell-time that exceeds the per-item maximum dwell-time indicting non-compliance with the cold-chain compliance parameters.

Figure 4:
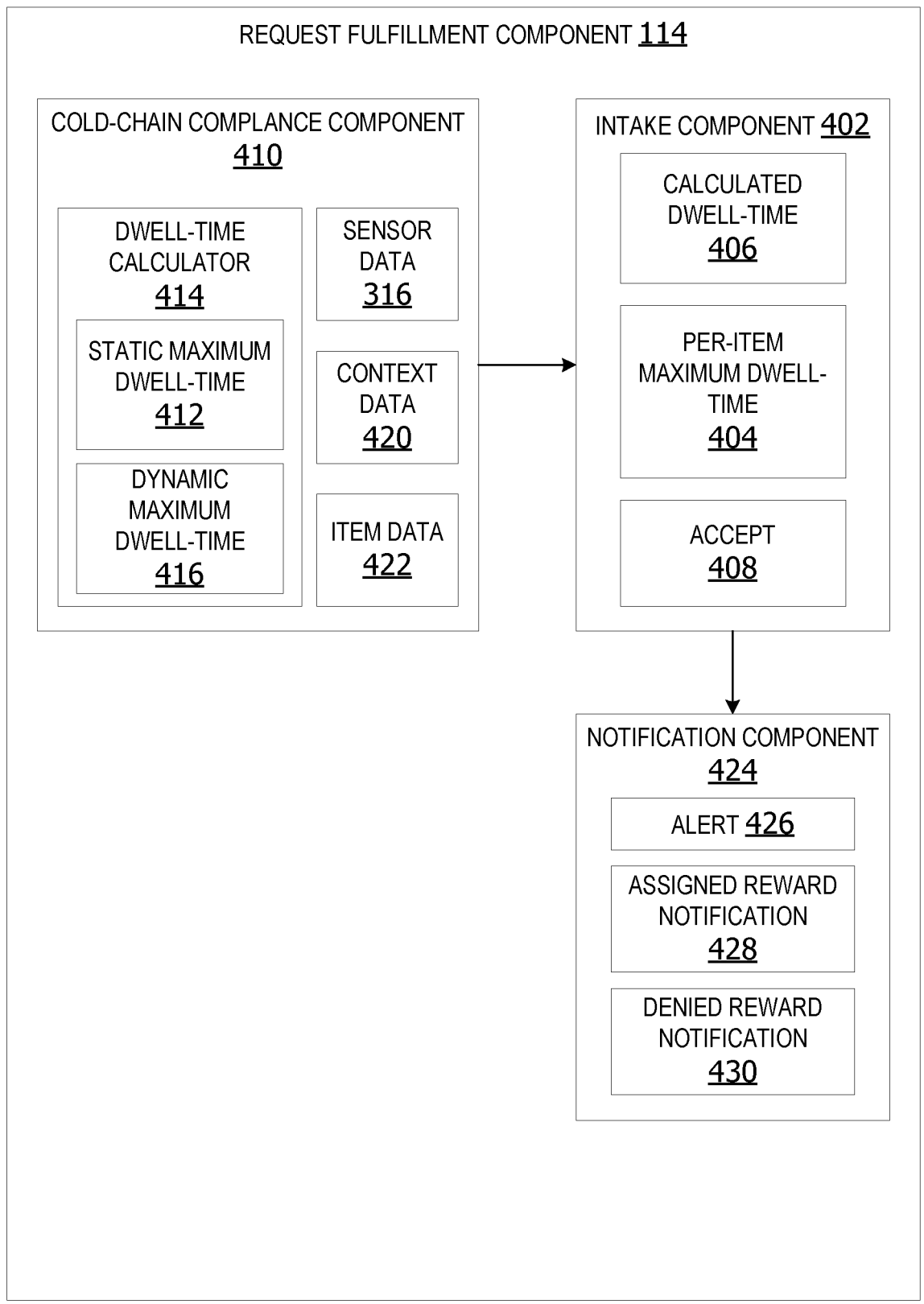
FIG. 4 is an exemplary block diagram illustrating a request fulfillment component for monitoring cold-chain compliance.

FIG. 4 is an exemplary block diagram illustrating a request fulfillment component 114 for monitoring cold-chain compliance. The intake component is a component that analyzes sensor data associated with a received item to determine whether to accept or reject the item based on the item assigned and the cold-chain compliance parameters. The intake component is a component such as, but not limited to, the intake component 314 in FIG. 3.

If the item conforms to an assigned item and the cold-chain compliance parameters, including the per-item maximum dwell-time 404, the intake component 402 accepts the item. In other words, the intake component 402 accepts the item if the per-item maximum dwell-time 404 for the item or the item exceeds the calculated dwell-time 406 for the item. The intake component 402 and rejects any item having a calculated dwell-time 406 that exceeds the per-item maximum dwell-time 404 due to non-compliance with the cold-chain compliance parameters.

The per-item maximum dwell-time 404 is provided to the intake component 402 by a cold-chain compliance component 410. The per-item maximum dwell-time in some examples is a static maximum dwell-time 412. The static maximum per-item dwell-time is a predetermined dwell-time assigned to a given item. The static maximum dwell-time 412 does not change from day-to-day.

The static maximum dwell-time 412 is calculated by a dwell-time calculator 414 based on item data 422, including an ideal temperature range for the item.

In other examples, a dwell-time calculator 414 calculates a dynamic maximum (max) dwell-time for a perishable item based on real-time sensor data 316, context data 420, and the item data 422 associated with the selected item. The sensor data 316 is data generated by a set of sensor devices, such as the set of sensor devices 140 in FIG. 1 and/or FIG. 2. The sensor data is generated by one or more sensor device(s) associated with the selected item located within the item selection area, such as, but not limited to, the set of sensor devices 140 in FIG. 1 and/or FIG. 2. The sensor devices can include one or more thermometers for monitoring temperature ambient temperature and other conditions within the item selection area. When the sensor data indicates a temperature change within the item selection area, the dwell-time calculator 414 dynamically generates a new per-item dwell-time based on the change in condition within the item selection area.

For examples, if the weather outside is very cold it can influence the temperature inside the item selection area as well. As the temperature inside the item selection area drops, the dynamic per-item dwell-time can be increased. Likewise, if the temperature inside the item selection area increases (becomes hotter), it can be necessary to decrease the dynamic per-item dwell-time to reduce exposure of the item to the warmer ambient temperatures inside the store. In this manner, the system more efficiently adjusts for changes in temperature and other conditions which can influence the tolerance level a particular temperature-sensitive item can have for the temperature outside the items assigned temperature-controlled display area.

In other examples, the context data 420 is utilized to adjust the dynamic maximum dwell-time 416 for a given item. The context data 420 includes data associated with current conditions inside the item selection area. For example, the context data 420 can include data regarding congestion in the aisles, amount of foot traffic, length of lines at item intake areas, number of users within one or more areas of the item selection area, etc. If the context data indicates the store is very crowded, certain aisles are very congested, or lines at item intake areas exceed a threshold amount, the dynamic maximum dwell-time 416 can be shortened to ensure the user selects cold-chain compliant items last/immediately prior to delivering items to an intake area rather than keep those items in a cart while moving through congested areas of the store.

A notification component 424 outputs the list of assigned perishable items to the user with the per-item maximum dwell-time for each item. If a perishable item is not received at an item intake area within a threshold time-period prior to expiration of the maximum dwell-time for a given item, the notification component 424 outputs an alert 426 to the user. The alert 426 can include an identification of the item, the amount of time remaining until the expiration of the dwell-time for the identified item, and a location of a nearest intake area where the user can deliver the identified item.

If the user delivers the identified item to the intake area prior to expiration of the per-item maximum dwell-time and the item matches an item assigned to the user, the notification component 424 outputs an assigned reward notification 428 to the user. The assigned reward notification 428 informs the user of a reward or incentive made available to the user for successfully selecting and delivering the assigned perishable items to the one or more intake areas.

If the user fails to deliver one or more items to the intake area prior to expiration of the per-item maximum dwell-time, the notification component 424 outputs a denied reward notification 430. The denied reward notification 430 can include an identification of the item which was non-conforming or otherwise failed to meet retrieval criteria and/or was delivered after expiration of the maximum dwell-time. The denied reward notification 430 includes a reason for denial of the reward, in some examples.

Figure 5:
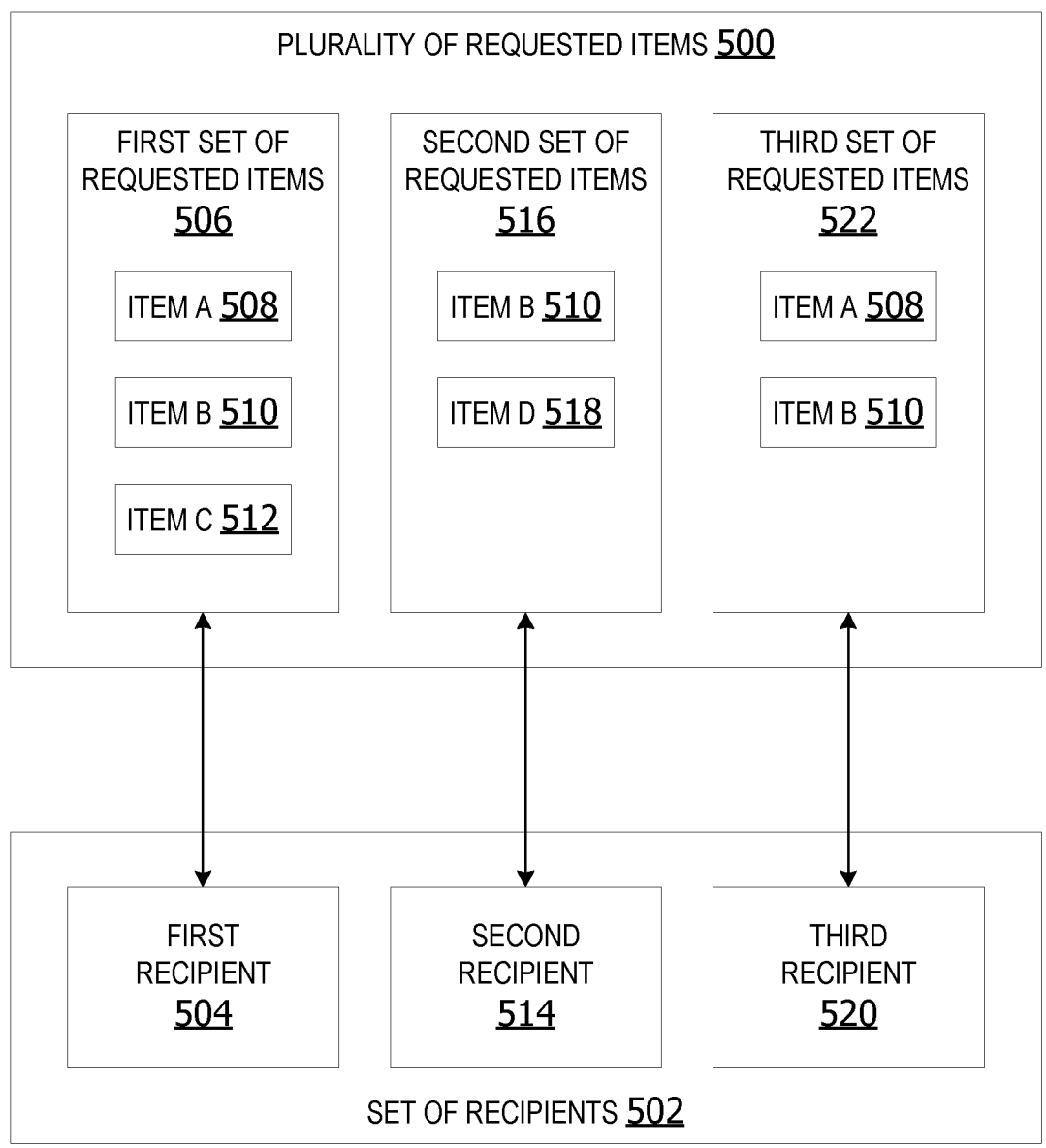
FIG. 5 is an exemplary block diagram illustrating a plurality of requested items associated with one or more recipients.

FIG. 5 is an exemplary block diagram illustrating a plurality of requested items 500 associated with one or more recipients. The plurality of requested items 500 includes two or more items requested in two or more orders made by two or more recipients in a set of recipients 502. In this example, a first recipient 504 requests a first set of requested items 506 including at least one instance of item `A _ 508, one or more instances of item `B _ 510, and one or more instances of item `C _ 512.

If item `A _ is a perishable carton of soy milk and item `C _ is a package of size `A A_ batteries, assignment of item `A _ will have a set of cold-chain compliance parameters, including a maximum dwell-time but item `B _ will not include a maximum dwell-time because item batteries are non-perishable items.

A second recipient 514 requests items in a second set of requested items 516. The second set of requested items 516 in this non-limiting example includes at least one instance of item `B _ 510 and one or more instances of item `D _ 518. Likewise, a third recipient 520 in this example requested a third set of requested items 522 including one or more instances of item `A _ 508 and one or more instances of item `B _ 510.

In some examples, the plurality of requested items available for assignment to a user for retrieval from the item selection area includes all instances of item `A _ 508, item `B _ 510, item `C _ 512, and item `D _ 518 requested in the first set of requested items 506, the second set of requested items 516, and the third set of requested items 522 which have not yet been retrieved and delivered to an intake area for order-fulfillment.

For example, if item `B _ 510 is a loaf of bread, and the first set of requested items 506, the second set of requested items 516, and the third set of requested items 522 each include a request for one loaf of bread, the plurality of requested items 500 includes three loaves of bread available for assignment to a user for retrieval. If a given user is selected to retrieve item `B _ 510, the user is assigned to retrieve all three instances of item `B _ (three loaves of bread). Thus, in this non-limiting example, a single user is assigned to retrieve multiple instances of an item requested by two or more remote recipients for partial fulfillment of two or more orders.

However, the same user can be assigned to retrieve item `A _ 508, item `C _ 512, or item `D _ 518. Likewise, multiple different users can be assigned to retrieve item `A _ 508, item `C _ 512, or item `D _ 518. In other words, a first user can retrieve item `A _ and a second user retrieves item `C C_ and item `D ._

In another example, if item `A _ is a can of frozen juice and item `D _ 518 is a bag of frozen peas, the same user can be assigned to retrieve all instances of item `A _ requested in the first set of requested items 506 and the third set of requested items 522, as well as all instances of item ˋD _ 518 requested in the second set of requested items due to the proximity of frozen juice and frozen peas within a frozen foods section of an item selection area and/or similar cold-chain compliance parameters associated with both types of frozen food items. However, the user assigned to retrieve item ˋA _ and ˋD _ in this example, cannot be assigned to retrieve item ˋB _ 510 and item ˋC _ 512 if those items are non-perishable items which are not located within a predetermined distance (proximity) to items ˋA _ and item ˋD _.

In still another example, a single user can be assigned to retrieve all the instances of the items 508, 510, 521, and 518 to fulfill all three of the orders for first recipient 504, the second recipient 514, and the third recipient 520. In another example, a first user can be assigned to retrieve all instances of item ˋA _ 508 and item ˋD _ 518 while a second user is assigned to retrieve all instances of item ˋB _ 510 and item ˋC _ 512 to fulfill all three of the orders for first recipient 504, the second recipient 514, and the third recipient 520.

Figure 6:
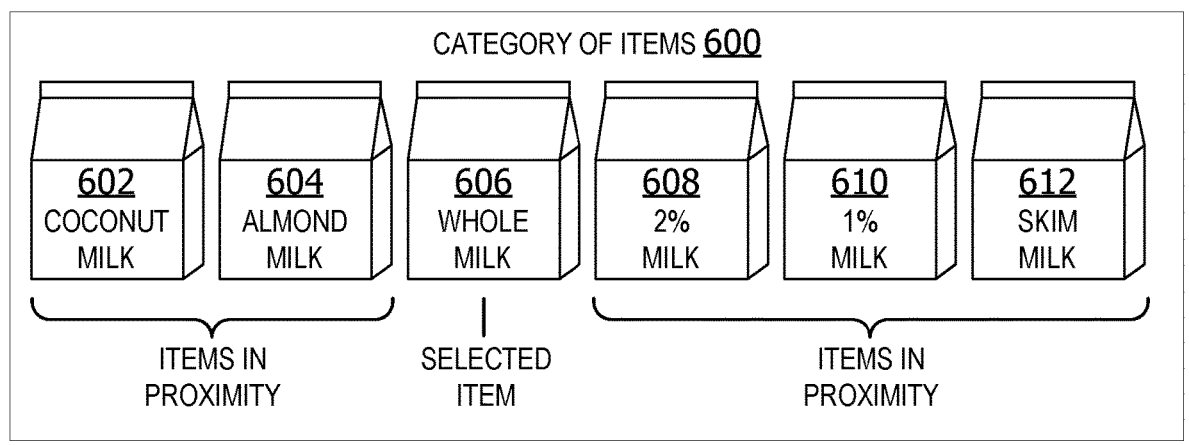
FIG. 6 is an exemplary block diagram illustrating a category of items.

FIG. 6 is an exemplary block diagram illustrating a category of items 600. The category of items 600 is a milk or dairy category in this example. However, the examples are not limited to milk or dairy categories. Item categories can include frozen foods, frozen desserts, ice cream, deli items, juices, meat, or any other category for perishable items subject to cold-chain compliance parameters.

The category in this non-limiting example includes coconut milk 602, almond milk 604, whole milk 606, two-percent milk 608, one-percent milk 610, and skim milk 612. A category is not limited to the items shown in FIG. 6. In other examples, a category can include items not shown in FIG. 6.

Items in the milk category can be assigned to a user based on cold-chain compliance score(s) and/or restriction(s) assigned to the user. If a user's cold-chain compliance score is within an acceptable range or is greater than a minimum score, the user can be assigned items requiring cold-chain compliance, such as, but not limited to, items in the milk category.

In another example, if a user's cold-chain compliance score is a per-item cold-chain compliance score for whole milk and the score is within an acceptable range and/or above a minimum threshold score, the user can be assigned to retrieve one or more instances of whole milk 606. For example, the request fulfillment component can assign five gallons of whole milk to be retrieved by the user for fulfillment of one or more grocery orders made by one or more remote recipients. In this manner, the user is only assigned to retrieve items for other recipients that the user has demonstrated an ability to handle in accordance with cold-chain compliance parameters for previous items retrieved by the user in the past.

Likewise, if the user has a per-item restriction prohibiting assignment of whole milk to the user due to previous poor cold-chain compliance scores associated with milk item selection, the request fulfillment component does not assign milk to the user.

In another example, if a user's cold-chain compliance score is a per-category cold-chain compliance score, and the user's cold-chain compliance score for milk-related items is within an acceptable range and/or above a minimum score, the item request component can assign one or more instances of other items in the same category, such as, but not limited to, the category of items 600. In this example, coconut milk 602, almond milk 604, whole milk 606, two-percent milk 608, one-percent milk 610, and skim milk 612 are all assigned to the same category. Therefore, any instances of the coconut milk 602, almond milk 604, whole milk 606, two-percent milk 608, one-percent milk 610, and skim milk 612 in the plurality of requested items can be assigned to the user if the user's per-category cold-chain compliance score is an acceptable score. In this manner, the user is only assigned to retrieve items the user has previously demonstrated an ability to retrieve while adhering to cold-chain compliance standards.

In this example, coconut milk 602, almond milk 604, whole milk 606, two-percent milk 608, one-percent milk 610, and skim milk 612 are all assigned to a same or similar location in a refrigerated display. The coconut milk 602, almond milk 604, whole milk 606, two-percent milk 608, one-percent milk 610, and skim milk 612 are located within the predetermined distance from the whole milk 606. Therefore, any instances of the coconut milk 602, almond milk 604, whole milk 606, two-percent milk 608, one-percent milk 610, and skim milk 612 in the plurality of requested items can be assigned to the user. In this manner, the user is only assigned to retrieve items located near one or more items the user already plans to obtain from the store. This eliminates wasted time and effort spend by the user roaming around a store searching for an unfamiliar item.

In other examples, if the user has a per-category restriction prohibiting assignment of items in a dairy category or milk-related items category, the system does not assign any of the items in the category of items 600 to the user. This prevents inefficient use of resources and potential spoilage of dairy items due to non-compliance with cold-chain requirements.

Figure 7:
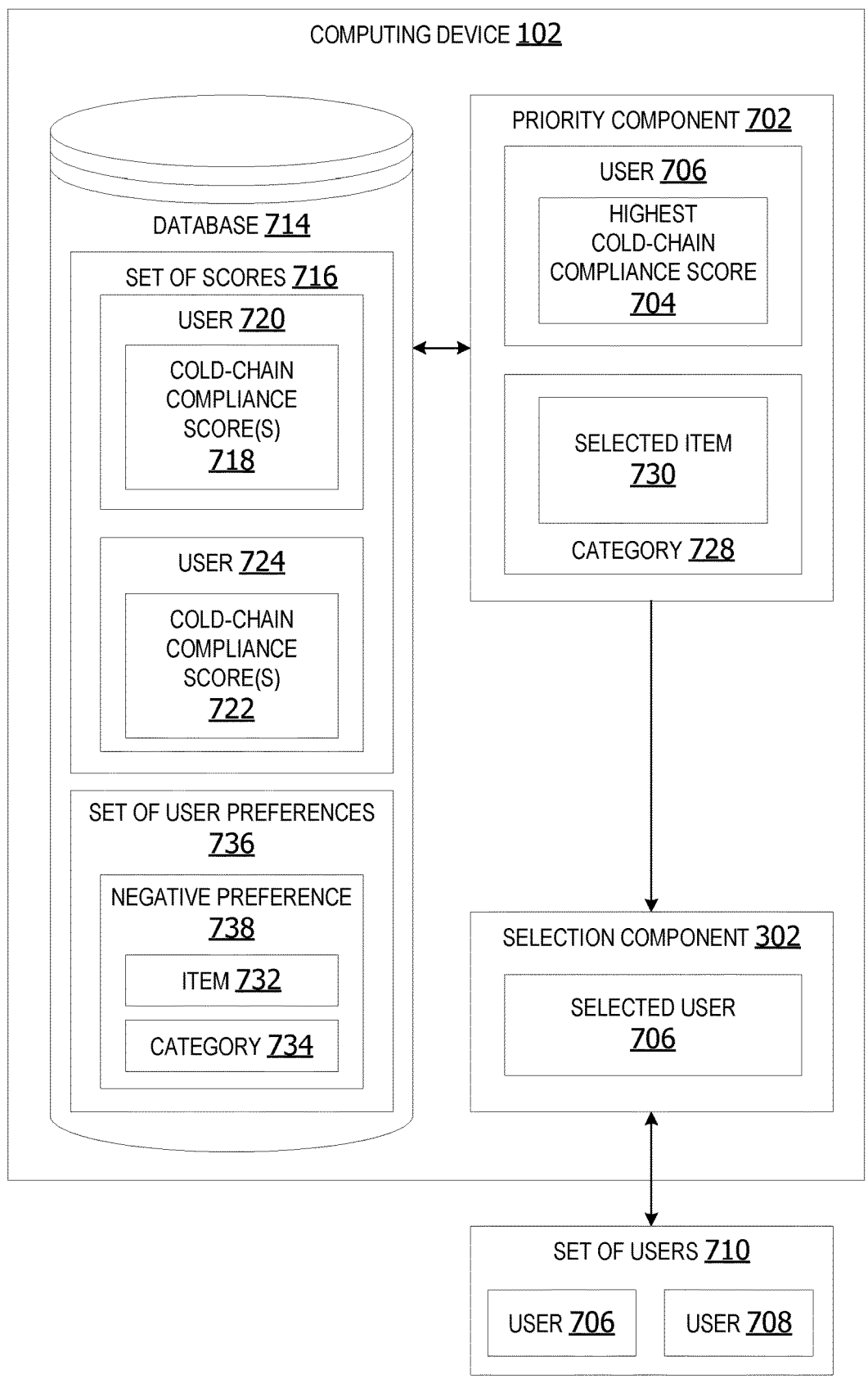
FIG. 7 is an exemplary block diagram illustrating a priority component for selecting a user having a highest cold-chain compliance score.

FIG. 7 is an exemplary block diagram illustrating a computing device 102 executing a priority component 702 for selecting a user having a highest cold-chain compliance score 704. The priority component 702 selects a user, such as user 706 or 708, from a set of one or more users 710 available to retrieve one or more items from an item selection area. In this example, the selection component 302 recognizes two or more identified users qualified and available to retrieve one or more items. The system does not assign two users to retrieve the same item in this example to prevent retrieval of duplicate items or retrieval of unwanted items. Therefore, where two or more users are available and qualified to retrieve the same item, the selection component 302 selects the user 706 having the highest cold-chain compliance score 704 indicating level of adherence to cold-chain compliance rules associated with previous sets of items retrieved by an identified user.

The cold-chain compliance score is generated based on the number of perishable items subject to cold-chain compliance parameters retrieved by the user that were accepted by the intake component. If the user consistently retrieves perishable items within the per-item maximum dwell-time, the cold-chain compliance score is higher (within an acceptable score range).

The cold-chain compliance score in other examples also reflects condition of temperature sensitive items retrieved. The condition can include package integrity, expiration dates, freshness, temperature of item at drop-off, etc. For example, if a box of ice cream is melted/leaking, the condition is poor. If a frozen item is soft or partially defrosted, the score generated for the user is lower to reflect the poor quality of the items selected. Likewise, if a milk carton is punctured or it is at or near an expiration date, the score can be lower to reflect those issues as well.

The cold-chain compliance score is generated for each user by a scoring component, such as the scoring component 322 in FIG. 3. The cold-chain compliance score can be generated based on feedback provided by a recipient of the items or an order-filler using the perishable items retrieved by the user to fill an order. The cold-chain compliance scores for each user are stored in a database 714 in this example. The database 714 is a data structure associated with a data storage, such as, but not limited to, the data storage device 136 in FIG. 1.

The set of scores 716 includes the cold-chain compliance score(s) 718 for each unique user which has retrieved at least one assigned item on at least one occasion. In this example, one or more cold-chain compliance scores 718 are stored for a user 720 and one or more cold-chain compliance scores 722 are stored for a different user 724. The one or more cold-chain compliance scores can include a per-user score, a per-category score, and/or a per-item score.

In this example, the selection component 302 identifies a selected user 726 having the highest cold-chain compliance score 704 associated with the user 726, a category 728 of an item to be assigned for retrieval, and/or the selected item 730 to be retrieved. In other words, if the item to be retrieved is a bag of frozen strawberries, a user can be selected that has a highest per-user cold-chain compliance score, the user having the highest frozen-produce category score, and/or the user having the highest cold-chain compliance score for frozen strawberries.

In some examples, only one score is used to select the user. For example, the user having the highest per-item cold-chain compliance score is chosen. In other examples, the user having the highest per-category cold-chain compliance score is chosen. In still other example, the user having the highest per-user cold-chain compliance score is choses.

Two or more scores can be used in other examples to select a user. For example, the user having the highest of all three scores is selected. In other words, the user has the highest per-user cold-chain compliance score, per-category cold-chain compliance score, and per-item cold-chain compliance score is chosen. The user having a highest per-item cold-chain compliance score and per-user cold-chain compliance score can be chosen. In other examples, the user having the highest per-category cold-chain compliance score and per-item cold-chain compliance score can be chosen. The user having the highest per-user cold-chain compliance score and per-category cold-chain compliance score can be selected in other examples.

A set of user preferences 736 is a set of one or more user-provided item retrieval preferences. A user preference can include a positive preference indicating items the user prefers to retrieve. A user preference can also include a negative preference 738 indicating an item 732 the user prefers not to retrieve. For example, the negative preference 738 can indicate that the user prefers not to retrieve bacon.

In other examples, the user preferences can indicate a negative preference 738 for a category 734 of items. For example, the user can indicate in user-provided data that the user is a vegan and prefers not to retrieve meat-related items.

Figure 8:
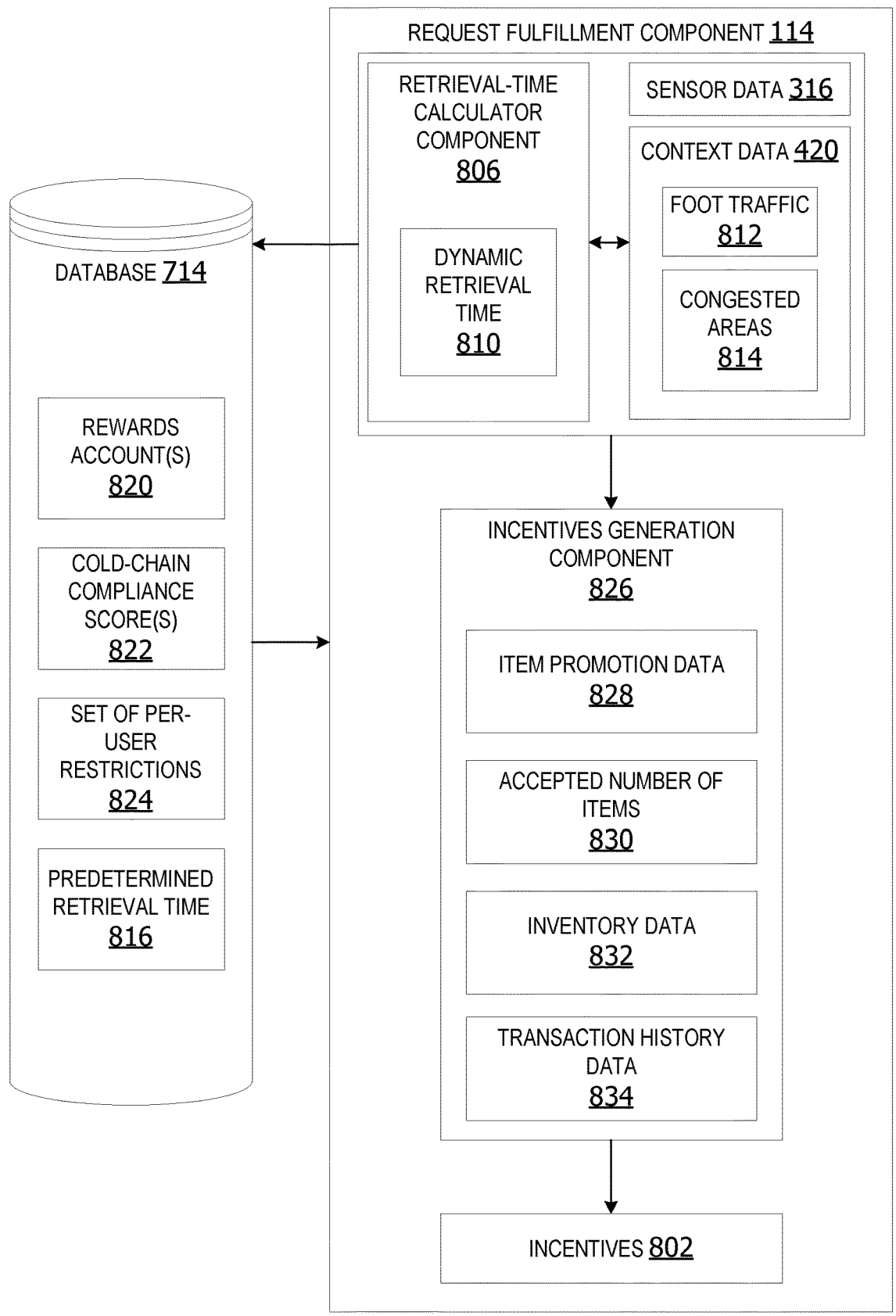
FIG. 8 is an exemplary block diagram illustrating assignment of incentives for retrieval of items.

FIG. 8 is an exemplary block diagram illustrating assignment of incentives 802 to a user for retrieval of items in compliance with cold-chain compliance parameters. A request fulfillment component 114 analyzes sensor data 316 generated by a set of one or more sensors associated with one or more intake areas to calculated dwell-time for each item retrieved, quality of items retrieved, and accuracy of retrieved items selected by the user. The sensor data 316 can be generated by sensor devices associated with an intake area, such as the set of sensor devices 140 in FIG. 1 and/or FIG. 2.

The sensor data 316 in other examples can also include data generated by sensors associated with the plurality of items in the item selection area, such as the item selection area 142 in FIG. 1 and FIG. 2. A retrieval-time calculator component 806 analyzes the sensor data 316 and/or context data 420 associated with the item selection area to generate a dynamic retrieval time 810 for one or more items in the plurality of requested items.

The context data 420 is data associated with current conditions within the item selection area. The sources of the context data can include a weather feed, news feed, current events calendars, the sensor data 316, and/or the database 714. The context data 420 in some examples is analyzes to determine current and/or predicted foot traffic 812 and congested areas 814 within the item selection area.

The dynamic retrieval time 810 is an estimated time required to retrieve an item from a display area assigned to the item in the item selection area. For example, if a requested item is a package of frozen biscuits, the dynamic retrieval time 810 is an estimated amount of time required for a user to walk to the assigned modular location (assigned display area) for the package of frozen biscuits, and then deliver the item to an intake area. If there are multiple intake areas associated with the item selection area, the dynamic retrieval time 810 can include an estimated time to retrieve the item and take it to the intake area nearest to the assigned location of the item.

Multiple intake areas can be provided within the item selection area to prevent a bottle-neck associated with retrieved item drop-offs by multiple users. Likewise, multiple drop off locations enable users to drop-off items at different intake areas as the user retrieves the items. This enables the user to quickly retrieve items and more easily locate intake areas. With multiple intake areas, the user is more likely to locate at least one intake area with less effort.

The dynamic retrieval time 810 is calculated in real-time based on foot traffic and/or congested areas within a store or other item selection area, as well as any other changing environmental factors which can influence the time for item retrieval. For example, if the aisles are relatively empty, the retrieval time can be three minutes. However, if the aisles near the location of the item is congested with a significant number of other people, the retrieval time can increase to four or five minutes due to the increased foot traffic and/or obstructions in the aisles.

In other examples, the dynamic retrieval time 810 is generated based on a location of one or more items, a location of one or more intake areas, a location of one or more items on the user-provided list of items, a map of the item selection area, the number of items on the user-provided list of items, the time of day, day of the week, month, season, restocking schedules, store traffic patterns, and/or any other context data.

The user-provided amount of time available for retrieving items is compared with the dynamic retrieval time 810 for each item in the plurality of items to be retrieved. The assignment component selects items for retrieval by a given user that have a dynamic retrieval time 810 that is less than the user-provided time available for retrieving items.

In other examples, a predetermined retrieval time 816 for each item can be utilized instead of the dynamic retrieval time 810. The predetermined retrieval time 816 is a static retrieval time calculated based on average conditions within the item selection area.

The predetermined retrieval time 816 can be stored in a database 714 for storing data. The database 714 can be implemented as a relational database, filesystem, or any other type of data storage.

The database 714 can include other item retrieval related data, such as, but not limited to, rewards account(s) 820, cold-chain compliance score(s) 822, and/or a set of per-user restrictions 824. The rewards account(s) 820 includes a rewards account for each user. The rewards account(s) 820 include a record of incentives 802 assigned to each user for retrieving items. The incentives 802 can include coupons, discounts, freebie items, reward points, store credit, cash incentive, or any other type of incentive. An incentive discount can be a discount on a single item or a discount on an entire purchase amount.

In some examples, an incentive is not assigned to the user until a threshold time-period has passed to enable the recipient of the retrieved items to send feedback indicating the quality and accuracy of the items retrieved. For example, an incentive can be output twenty-four hours after the item retrieval to enable sufficient time for feedback/evaluation of the quality of the items retrieved. In other examples, the incentive is output to the user on the user's next visit to the store. In still other examples, the incentive is output to the user when the user makes a next purchase of one or more items at the store.

Cold-chain compliance score(s) 822 include one or more cold-chain compliance scores assigned to each user. A cold-chain compliance score can include a per-user cold-chain compliance score, a per-category cold-chain compliance score, and/or a per-item cold-chain compliance score. Per-user restriction(s) 824 can include one or more cold-chain compliant item restrictions assigned to a user. A restriction is a prohibition indicating that a given user is not approved for retrieving a perishable item having one or more cold-chain compliance parameters. The per-user restrictions can include a category restriction disqualifying the user from retrieving items in a specific category.

In other examples, the set of per-user restrictions 824 can also include a restriction on all cold-chain compliance items. In other words, a per-user restriction can disqualify a user from retrieving any item having cold-chain requirements/rules. In this example, all cold-chain items are restricted.

A cold-chain compliance restriction can be assigned to a user if the user receives negative feedback associated with one or more perishable items. A restriction can also be assigned if the user fails to retrieve items conforming to the cold-chain compliance parameters.

In some examples, an incentives generation component 826 analyzes item promotion data 828, an accepted number of items 830, inventory data 832, and/or transaction history data 834 to identify one or more incentives 802 to assign to the user as a reward for retrieving one or more items and delivering the item(s) to at least one intake area within an assigned amount of retrieval time.

The item promotion data 828 is data associated with promotions for one or more items in the plurality of items available within the item selection area to identify one or more items to offer as an incentive. The accepted number of items 830 is the number of items retrieved by the user and delivered to at least one intake area that conforms to one or more assigned items and the retrieval criteria. In other words, the accepted number of items 830 is the number of correct items retrieved by the user which can be used for at least partial fulfillment of one or more orders. The accepted number of items 830 can include the number of items retrieved by the user which qualify the user to receive an incentive. The number of rejected items is the number of non-conforming items delivered to the intake area.

In some examples, the cold-chain compliance score generated for a given user is calculated based on the number of accepted items and the number of rejected items retrieved by the user. If the user retrieves many items which fail to comply with the cold-chain compliance parameters, the cold-chain compliance score is lower or falls outside the accepted threshold. As the number of accepted items increases, the cold-chain compliance score increases.

Inventory data 832 is data associated with items in current inventory. Inventory data 832 can be utilized to determine if there is a surplus of any items in inventory. Items having a surplus inventory can be identified for use as an incentive, either for a discount or a free item.

The transaction history data 834 is historical transaction data for a given user. The transaction history data 834 can identify items purchased by the user on previous occasions. A customized incentive for a given user can be identified based on items purchased by the user in the past. For example, if the user frequently purchases a particular brand of toothpaste, that brand of toothpaste can be offered to the user as an incentive for retrieving one or more items.

Figure 9:
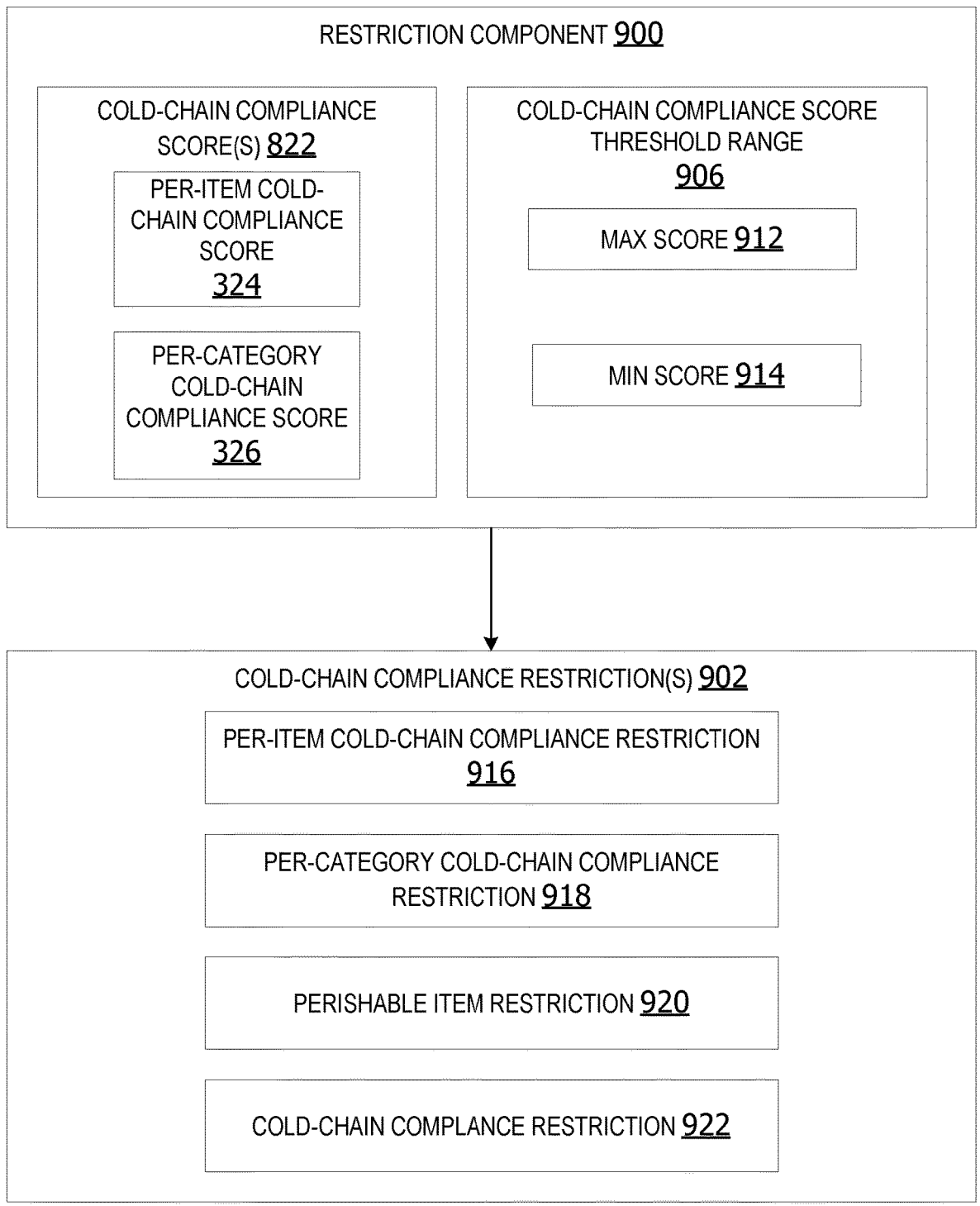
FIG. 9 is an exemplary block diagram illustrating a restriction component for assigning restrictions.

FIG. 9 is an exemplary block diagram illustrating a restriction component 900 for assigning cold-chain compliance restriction(s) 902 to one or more users. The restriction component 900 analyzes cold-chain compliance score(s) 904 for a given user based on a cold-chain compliance score threshold range 906 to identify cold-chain compliance restriction(s) 902 to be assigned to the given user.

The cold-chain compliance score(s) 904 can include a per-item cold-chain compliance score 324 and/or a per-category cold-chain compliance score 326 for a given item retrieved by the user. The restriction component 900 analyzes the cold-chain compliance score(s) 904 associated with at least one item assigned to the identified user for retrieval using the cold-chain compliance score threshold range 906. The cold-chain compliance score threshold range 906 in some examples includes a maximum (MAX) score 912 and/or a minimum (MIN) score 914. In other examples, the cold-chain compliance score(s) 904 can be compared to a single threshold value rather than a threshold range of values.

The cold-chain compliance score threshold range 906 can include a threshold range for per-item cold-chain compliance score 324 and a different threshold range for the per-category cold-chain compliance score 326. In other examples, the same cold-chain compliance score threshold range 906 can be utilized to analyze both pre-item scores and per-category scores both.

The restriction component 900 in some examples assigns a per-item restriction 916 to the user on condition the per-item cold-chain compliance score 324 falls outside the cold-chain compliance score threshold range 906. The restriction component 900 in other examples assigns a per-category cold-chain compliance restriction 918 to the user on condition the per-category cold-chain compliance score 326 falls outside the cold-chain compliance score threshold range 906.

The per-item restriction 916 prohibits assignment of a selected item to the identified user for retrieval. The per-category category cold-chain compliance restriction 918 prohibits assignment of any items within a selected category to the identified user for retrieval.

A restriction is assigned based on cold-chain compliance score(s) assigned to the user in some examples. If a user receives a poor or low cold-chain compliance score which is outside an acceptable threshold range/below a minimum threshold for items in a frozen foods category, the system assigns a per-category restriction precluding assignment of frozen food items to the user for retrieval.

In other examples, a per-category score and/or a per-item score can be utilized to determine whether to assign a given item to a user without in an absence of any cold-chain compliance restrictions. In these examples, the cold-chain compliance score for a given user is compared with a threshold score value to determine whether the score is acceptable. If the score is above the threshold, the item is assigned. If the score is below the threshold, the item is not assigned to the user.

In another example, if there is a per-item cold-chain compliance score associated with ice cream for the user, the assignment component can assign ice cream to the user if the per-item score for ice cream assigned to the user is above the threshold. However, if the per-item score is below the threshold, the assignment component does not assign ice cream to the user.

In one example, the per-item score trumps the per-category score. Thus, if the per-category score for frozen food is an acceptable score but the per-item score for ice cream is an unacceptable score based on the threshold score values, the assignment component does not assign the ice cream to the user.

In another example, an unacceptable per-category score trumps the per-item score. In this example, even if the per-item score for ice cream is an acceptable score, the ice cream is not assigned to the user if the user is also assigned an unacceptable per-category score for frozen foods. Thus, a negative or unacceptable per-item score or a per-category score can be used to disqualify a user from retrieving an item associated with those scores.

A perishable item restriction 920 is a restriction prohibiting assignment of any perishable items to the user. In other words, if an item is a perishable item and the user has a perishable items restriction assigned to the user, the item is not assigned to the user.

A cold-chain compliance restriction 922 is a restriction prohibiting assignment of any items having cold-chain compliance parameters associated with the item. In other words, if an item has a maximum dwell-time and the user has a cold-chain compliance restriction 922 assigned to the user, the item is not assigned to the user.

Figure 10:
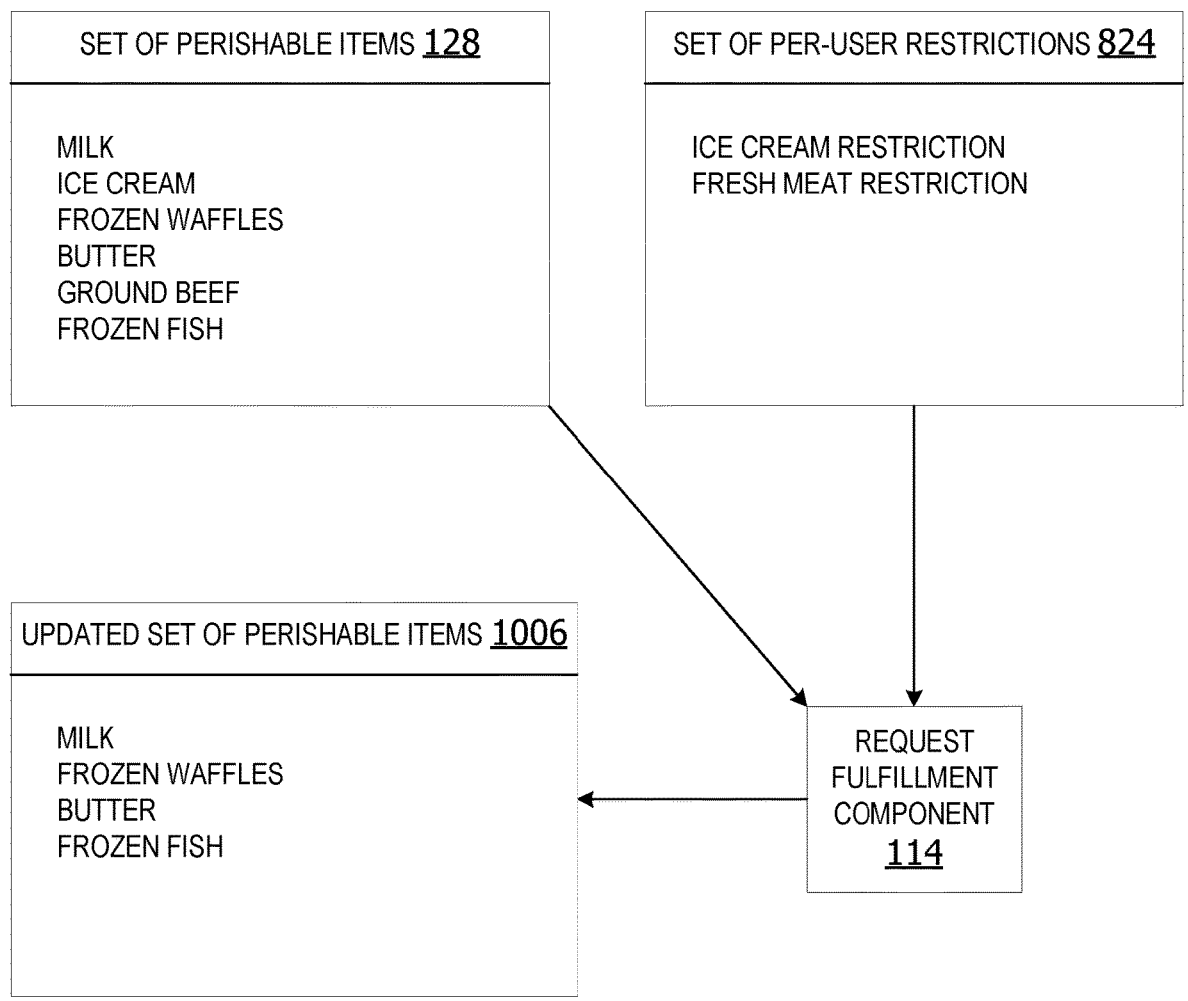
FIG. 10 is an exemplary block diagram illustrating a request fulfillment component for selecting perishable items for assignment to a user.

FIG. 10 is an exemplary block diagram illustrating a request fulfillment component 114 for selecting perishable items for assignment to a user. The request fulfillment component 114 analyzes a set of perishable items 128 to be retrieved by one or more users. The request fulfillment component 114 removes any items from the set of perishable items 128 assigned to a user that are restricted by the set of per-user restrictions 1004 to generate an updated set of perishable items 1006.

The set of per-user restrictions 1004 can include restrictions as to specific items and/or restrictions as to categories of items the user is eligible/approved to retrieve. If the set of perishable items 128 includes milk, ice cream, frozen waffles, butter, ground beef, and frozen fish and the set of per-user restrictions 1004 includes an ice cream restriction and a fresh meat restriction, the request fulfillment component 114 removes the ice cream item and the ground beef item from the set of perishable items 128. The updated set of perishable items 1006 in this example, only includes non-fresh meat items and no ice cream.

Figure 11:
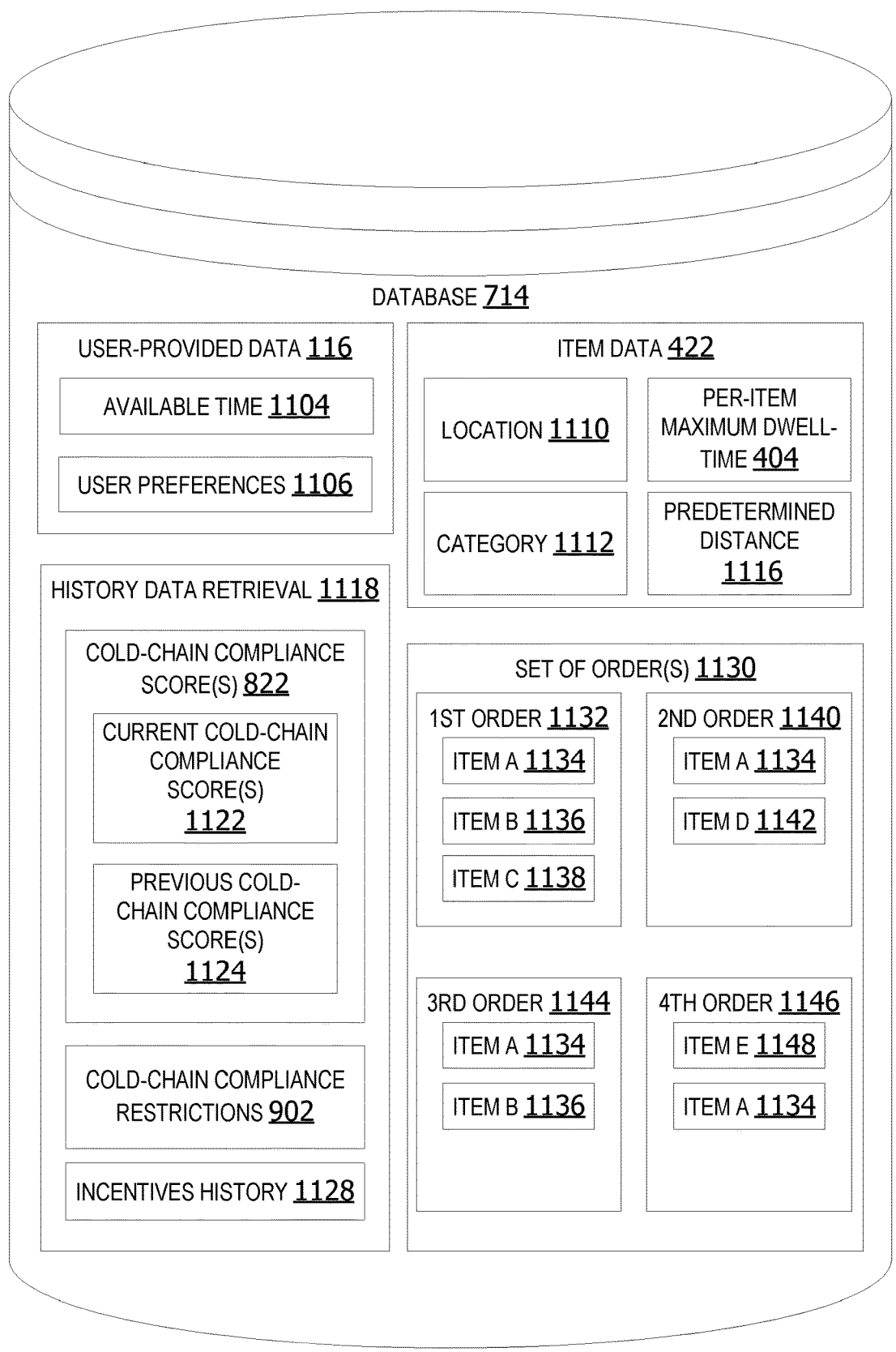
FIG. 11 is an exemplary block diagram illustrating a database storing item retrieval data.

FIG. 11 is an exemplary block diagram illustrating a database 714 storing item retrieval data. The item retrieval data can include user-provided data, such as the user-provided data 116 in FIG. 1. The user-provided data 116 can include available time 1104 for the user to retrieve items and user preferences 1106. The user preferences 1106 include items the user prefers to retrieve and/or items the user prefers not to retrieve. The user preferences 1106 include one or more preferences, such as, but not limited to, the set of user preferences 736 in FIG. 7.

In other examples, the user preferences 1106 can include negative preferences indicating a user prefers not to retrieve items or categories of items, such as, but not limited to, dairy, meat, animal products, or any other item or category of items. For example, if a user is on a dairy-free diet, the user preferences can indicate that the user does not want to retrieve items in the dairy category.

The database 714 can also include item data 422 associated with the one or more items in the plurality of requested items. The item data 422 includes an assigned location 1110 of the item in the item selection area, a category 1112 for the item, and a per-item maximum dwell-time 404 for retrieving the item. The per-item maximum dwell-time 404 can be a dynamic retrieval time calculated based on current conditions within the item selection area or a predetermined (static) retrieval time.

The item data 422 can also include a predetermined distance 1116 between item locations. The predetermined distance 1116 can specify a distance between assigned item locations and/or an identification of items located within the predetermined distance of each other.

In some examples, an item is assigned to the user for retrieval if the item is located within a predetermined distance from at least one other item assigned to the user for retrieval. In other examples, an item is assigned to the user for retrieval if the item is located within a predetermined distance from a current location of a user device associated with the user, such as the user device 118 in FIG. 1 and/or FIG. 2.

Retrieval history data 1118 is data associated with retrieval of items by a user. The retrieval history data 1118 can include one or more cold-chain compliance score(s) 1120 for the user. The score(s) 1120 can include current cold-chain compliance score(s) 1122 for the user and/or previous cold-chain compliance score(s) 1124 for the user. The retrieval history data 1118 can also include cold-chain compliance restrictions 902 assigned to the user and/or incentives history 1128. The incentives history 1128 includes a history of incentives assigned to the user.

A set of order(s) 1130 can include one or more orders. The first ($1^{st}$) order 1132 in this non-limiting example includes an item `A _ 1134, an item `B _ 1136, and an item `C _ 1138. The second ($2^{nd}$) order 1140 in this example includes another instance of item `A _ 1134 and item `D _ 1142. A third ($3^{rd}$) order 1144 includes another instance of item `A _ 1134 and another instance of item `B _ 1136. The fourth ($4^{th}$) order 1146 includes item `E _ 1148 and another instance of item `A _ 1134.

Each of the instances of items in the set of order(s) 1130 are included in the plurality of requested items to be assigned to one or more users for retrieval. A user can be assigned to retrieve all the items in the first order 1132 or assigned to retrieve one or two of the items in the first order 1132.

For example, one user can be assigned to retrieve all four instances of item 1134 for all four of the orders in the set of order(s) 1130 while another user is assigned to retrieve the two instances of item 1136, one instance of item D 1142 and one instance of item `E _ 1148. In other examples, a different user can be assigned to retrieve each different item. For example, a first user can retrieve the four instances of item 1134, a second user can retrieve the two instances of item 1136, a third user can retrieve item 1138, a fourth user can retrieve item D 1142, and a fifth user can retrieve item 1148. In still another example, a single user can be assigned to retrieve all instances of items 1134, 1136, 1138, 1142, and 1148 for fulfillment of all the orders in the set of order(s) 1130.

Figure 12:
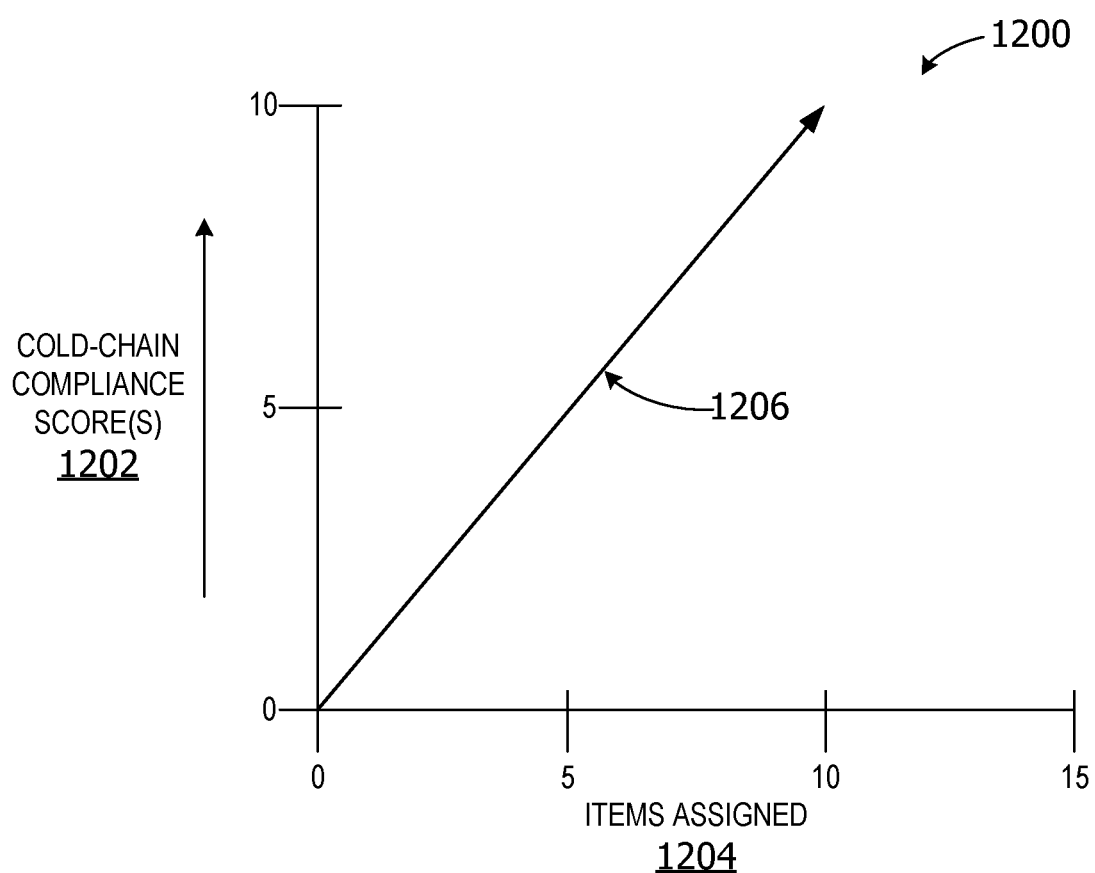
FIG. 12 is an exemplary graph illustrating item assignment based on per-user cold-chain compliance scores.

FIG. 12 is an exemplary graph 1200 illustrating perishable item assignment based on per-user cold-chain compliance scores 1202 for retrieval of items assigned 1204 to the user. The graph 1200 demonstrates that as a user's cold-chain compliance score increases, the user is trusted to retrieve more items having cold-chain compliance parameters. Therefore, the number of perishable items assigned to the user increases. Likewise, as the number of perishable items assigned to the user are successfully retrieved by the user in other examples, the user's cold-chain compliance score increases, as shown at 1206.

Figure 13:
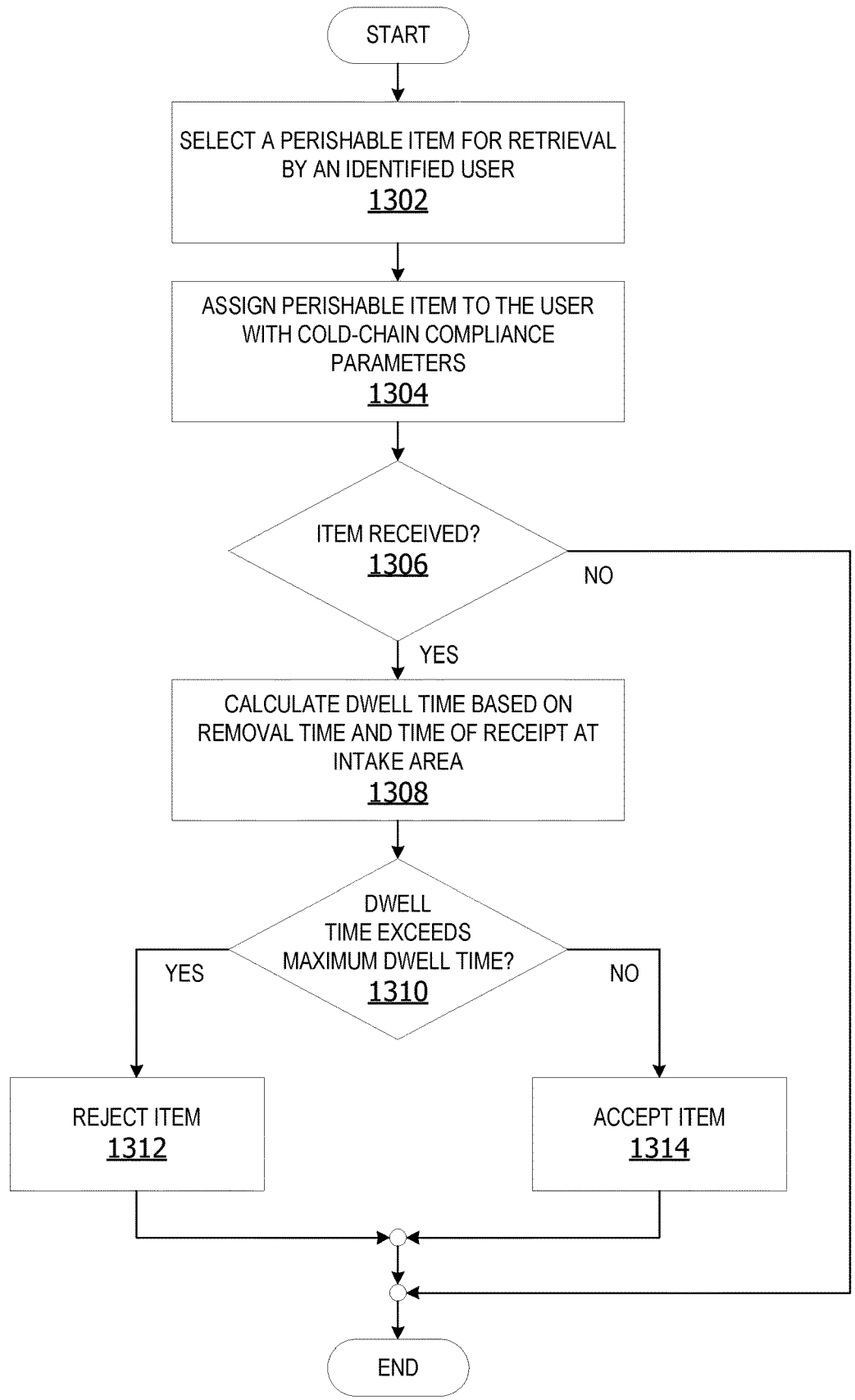
FIG. 13 is an exemplary flow chart illustrating operation of the computing device to perform crowdsourced cold-chain compliant item selection.

FIG. 13 is an exemplary flow chart illustrating operation of the computing device to perform crowdsourced cold-chain compliant item selection. The process shown in FIG. 13 can be performed by the request fulfillment component 114, executing on a computing device, such as the computing device 102 in FIG. 1 and FIG. 2.

The process begins by selecting an item for retrieval by an identified user at 1302. The perishable items are selected by a selection component, such as the selection component 302 in FIG. 3. An assignment component assigns the perishable item to the user with cold-chain compliance parameters at 1304. The assignment component is a component such as the assignment component 308 in FIG. 3. An intake component determines whether the assigned item is received at 1306. The intake component is a component associated with an intake area, such as the intake component 314 in FIG. 3. If no, the process terminates thereafter.

If the item is received at 1306, a dwell-time calculator calculates a dwell-time for the item based on a removal time and a time of receipt at the intake area at 1308. The time of receipt is the time at which the item is received at an intake area, such as the intake time 237 in FIG. 2.

The dwell-time calculator is a component for calculating dwell-time for items received at an intake area, such as the dwell-time calculator 414 in FIG. 4. A cold-chain compliance component determines if the calculated dwell-time for the item exceeds the maximum dwell-time for the item at 1310. The cold-chain compliance component is a component for managing cold-chain compliance, such as the cold-chain compliance component 410 in FIG. 4. If the dwell-time does exceed the maximum dwell-time, the intake component rejects the item at 1312. The process terminates thereafter.

If the calculated dwell-time for the item does not exceed the maximum dwell-time for the item at 1310, the intake component accepts the item at 1314. The process terminates thereafter.

While the operations illustrated in FIG. 13 are performed by a computing device, aspects of the disclosure contemplate performance of the operations by other entities. For example, a cloud service can perform one or more of the operations.

Figure 14:
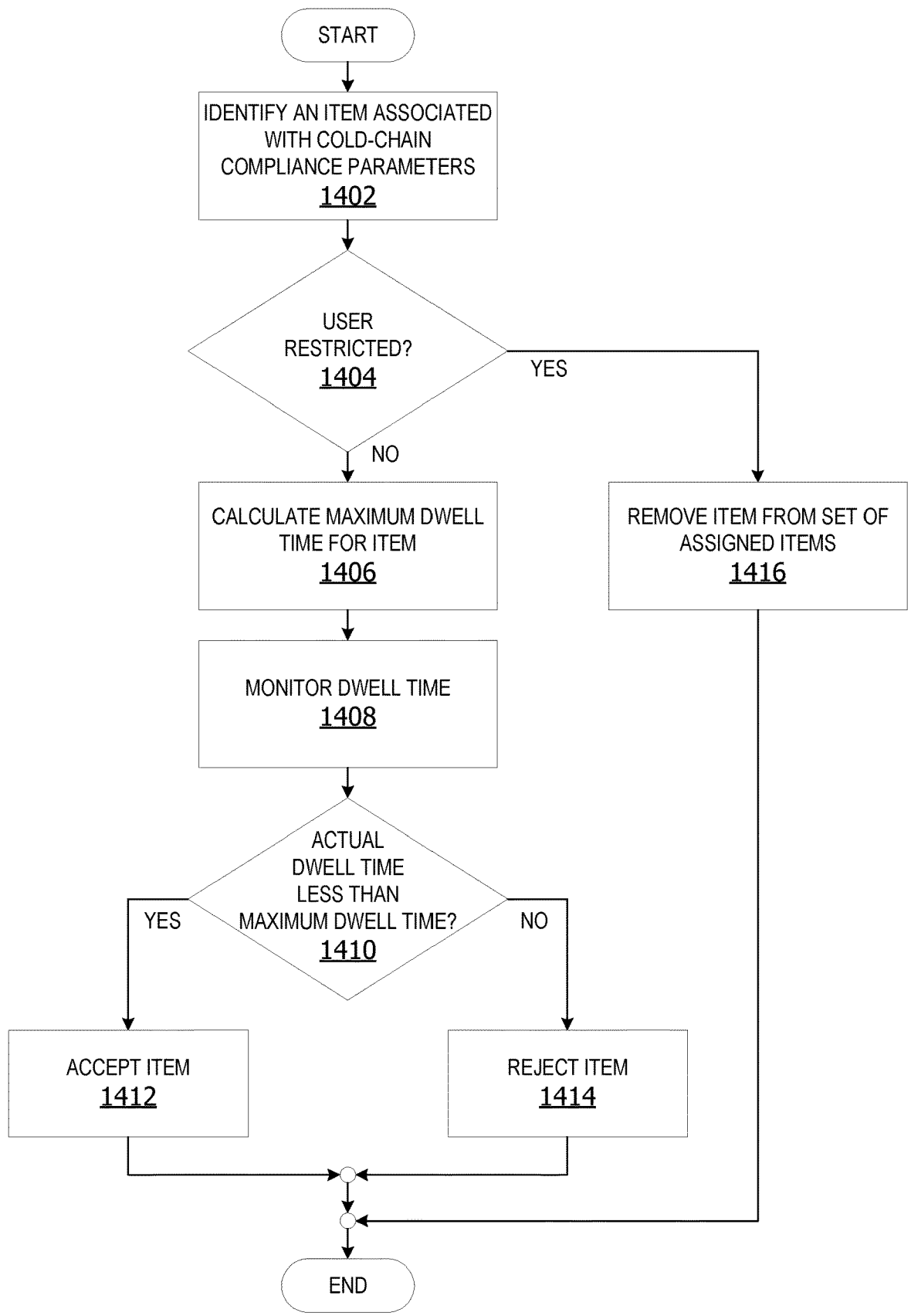
FIG. 14 is an exemplary flow chart illustrating operation of the computing device to perform cold-chain compliant item selection using cold-chain compliance restrictions.

FIG. 14 is an exemplary flow chart illustrating operation of the computing device to perform cold-chain compliant item selection using cold-chain compliance restrictions. The process shown in FIG. 14 can be performed by the request fulfillment component 114, executing on a computing device, such as the computing device 102 in FIG. 1 and FIG. 2.

The process begins by identifying an item associated with cold-chain compliance parameters at 1402. The selection component determines whether the user is restricted from retrieving cold-chain compliant items at 1404. If no, the dwell-time calculator calculates a maximum dwell-time for the item. The A dwell-time monitor monitors dwell-time for the item at 1408. The intake component determines if the actual dwell-time for the item is less than the maximum dwell-time for the item at 1410. The actual dwell-time is calculated when the item is received at an intake area. If the actual dwell-time is less than the maximum dwell-time, the intake component accepts the item at 1412. The process terminates thereafter.

Returning to 1410, if the actual dwell-time is not less than the maximum dwell-time, the intake component rejects the item. The process terminates thereafter.

Returning to 1404, if the user is restricted from retrieving items having cold-chain compliance parameters, the selection component removes the item from the set of assigned items for the user at 1416. The set of assigned items is a set of one or more items, such as, but not limited to, the set of assigned items 216 in FIG. 2 and/or FIG. 3. The process terminates thereafter.

Figure 17:
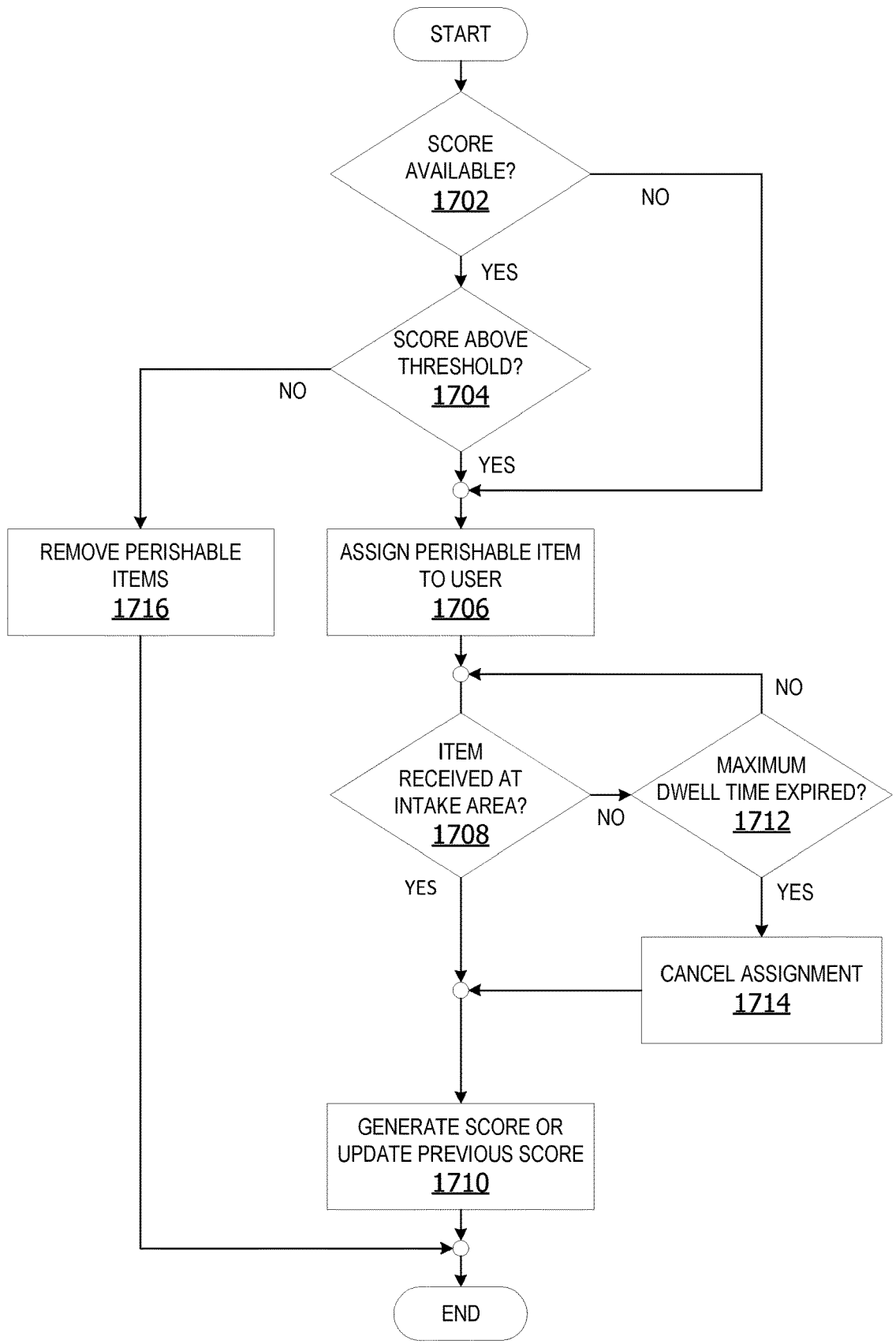
FIG. 17 is an exemplary flow chart illustrating operation of the computing device to assign items to a user based on a cold-chain compliance score.

While the operations illustrated in FIG. 17 are performed by a computing device, aspects of the disclosure contemplate performance of the operations by other entities. For example, a cloud service can perform one or more of the operations.

Figure 15:
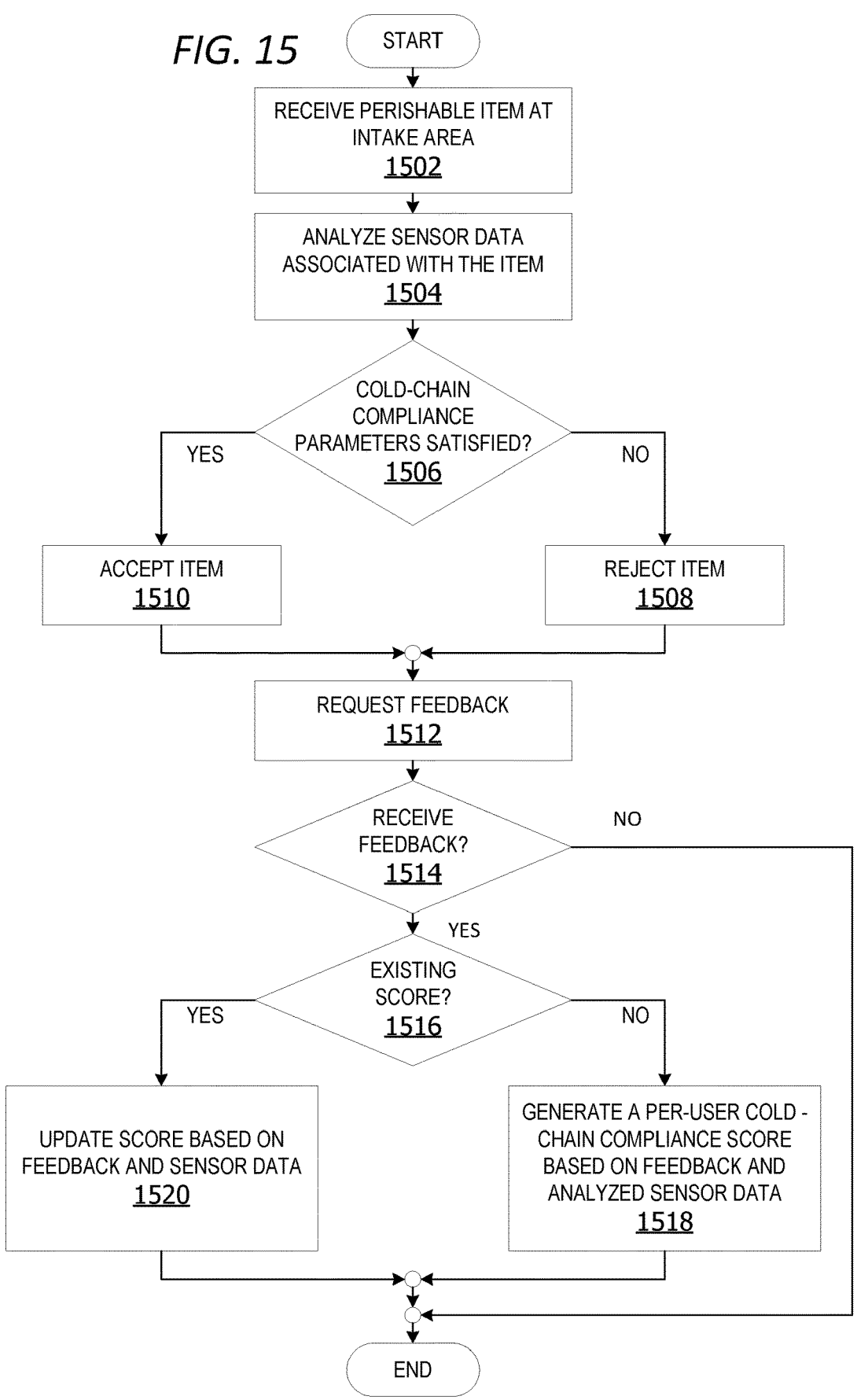
FIG. 15 is an exemplary flow chart illustrating operation of the computing device to evaluate items received at an intake area using cold-chain compliance parameters.

FIG. 15 is an exemplary flow chart illustrating operation of the computing device to evaluate items received at an intake area using cold-chain compliance parameters. The process shown in FIG. 15 can be performed by the request fulfillment component 114, executing on a computing device, such as the computing device 102 in FIG. 1 and FIG. 2.

The process begins by receiving a perishable item at an intake area at 1502. The item is identified by an intake component. The intake component analyzes sensor data associated with the item at 1504. The sensor data is generated by sensor devices, such as the set of sensor devices 140 in FIG. 1 and/or FIG. 2. The intake component determines whether cold-chain compliance parameters are satisfied at 1506. If no, the item is rejected at 1508. If the cold-chain compliance parameters are satisfied at 1506, the item is accepted by the intake component at 1510.

A feedback component requests feedback from one or more users at 1512. The feedback is data provided by the user, such as, but not limited to, the feedback 235 in FIG. 2 and/or FIG. 3. The feedback component is a component that queries one or more user devices associated with one or more users for feedback associated with the item, such as the feedback component 330 in FIG. 3. The feedback component determines whether feedback is received at 1514. If no, the process terminates thereafter.

If feedback is received at 1514, a scoring component determines if there is a pre-existing cold-chain compliance score for the user at 1516. The scoring component is a component for generating cold-chain compliance scores based on the number of items accepted, adherence with cold-chain compliance parameters, and/or feedback, such as the scoring component 322 in FIG. 3. If a pre-existing score is not assigned to the user, the scoring component generates a per-user cold-chain compliance score based on the feedback and the analyzed sensor data at 1518. The process terminates thereafter.

Returning to 1516, if an existing score is assigned to the user, the scoring component updates the existing cold-chain compliance score assigned to the user based on the feedback and sensor data at 1520. The process terminates thereafter.

While the operations illustrated in FIG. 15 are performed by a computing device, aspects of the disclosure contemplate performance of the operations by other entities. For example, a cloud service can perform one or more of the operations.

Figure 16:
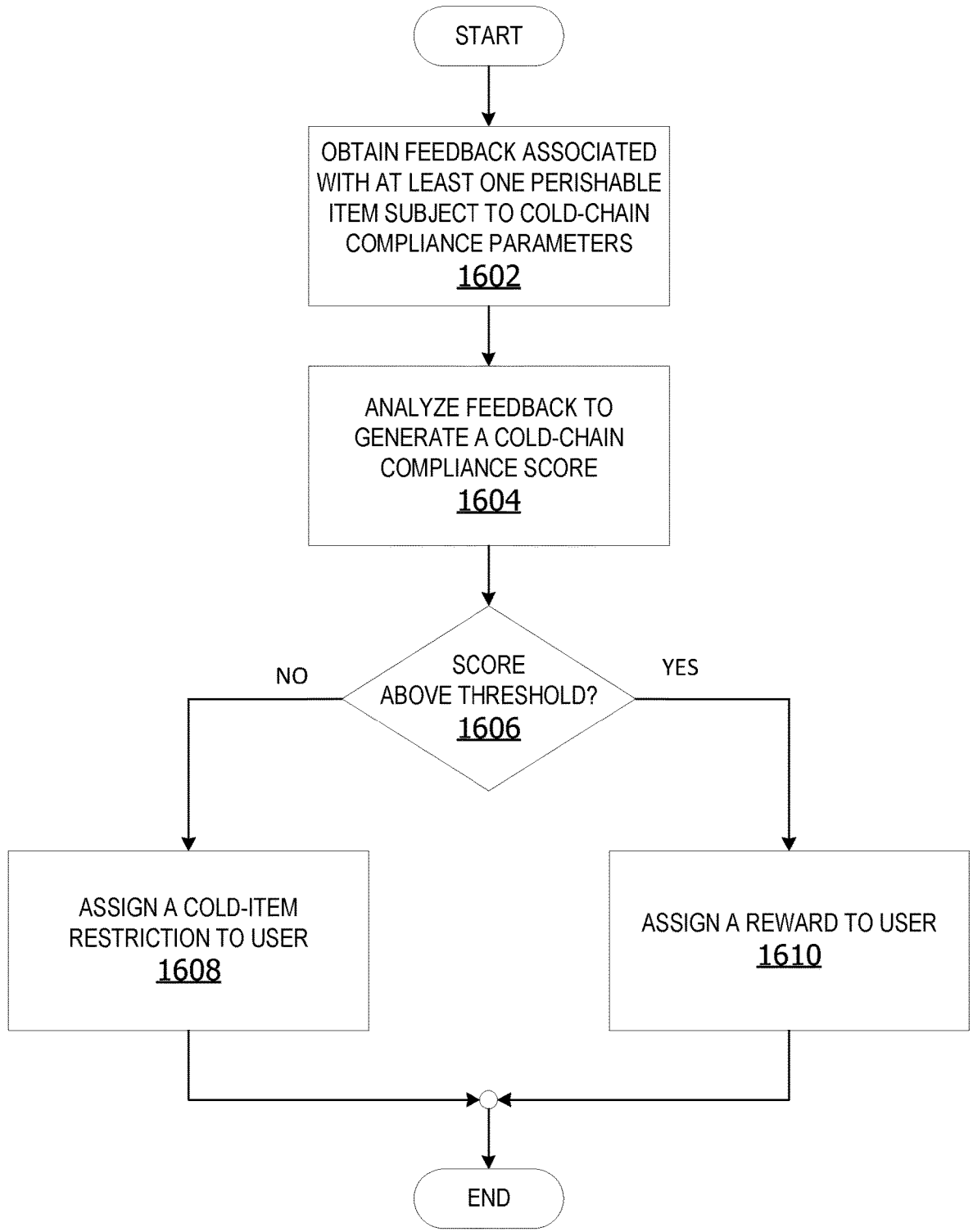
FIG. 16 is an exemplary flow chart illustrating operation of the computing device to assign cold-chain compliant item restrictions to a user.

FIG. 16 is an exemplary flow chart illustrating operation of the computing device to assign cold-chain compliant item restrictions to a user. The process shown in FIG. 16 can be performed by the request fulfillment component 114, executing on a computing device, such as the computing device 102 in FIG. 1 and FIG. 2.

The process begins by obtaining feedback associated with at least one perishable item subject to cold-chain compliance parameters at 1602. The feedback component analyzes feedback to generate a cold-chain compliance score at 1604. The selection component determines if the cold-chain compliance score is above a threshold score at 1606. If no, a restriction component assigns a cold-item restriction to the user at 1608. If the score is above the threshold, an incentives generation component assigns a reward to the user at 1610. The process terminates thereafter.

While the operations illustrated in FIG. 16 are performed by a computing device, aspects of the disclosure contemplate performance of the operations by other entities. For example, a cloud service can perform one or more of the operations.

FIG. 17 is an exemplary flow chart illustrating operation of the computing device to assign items to a user based on a cold-chain compliance score. The process shown in FIG. 17 can be performed by the request fulfillment component 114, executing on a computing device, such as the computing device 102 in FIG. 1 and FIG. 2.

The process begins by determining if a cold-chain compliance score for a user is available at 1702. If yes, the selection component determines if the score is above a threshold value at 1704. If yes, the assignment component assigns a perishable item to the user for retrieval at 1706. An intake component determines if an item is received at an intake area at 1708. If yes, the scoring component generates a cold-chain compliance score or updates a previous cold-chain compliance score for the user at 1710. The process terminates thereafter.

Returning to 1708, if the item is not received at the intake area, the dwell-time monitor determines if the maximum dwell-time is expired at 1712. If yes, the item assignment to the user is canceled at 1714. The cold-chain compliance score is generated or updated at 1710 and the process terminates thereafter.

Returning to 1704, if the cold-chain compliance score for the user is not above the threshold, the selection component removes the perishable items from the set of items assigned to the user for retrieval at 1716. The process terminates thereafter.

While the operations illustrated in FIG. 17 are performed by a computing device, aspects of the disclosure contemplate performance of the operations by other entities. For example, a cloud service can perform one or more of the operations.

Additional Examples

In some examples, a crowdsourced system for cold-chain compliant item selection by users in a store is provided. Items are assigned to a user based on the user's available time, preferences, cold-chain compliant score(s), feedback, and/or restrictions assigned to the user. The system uses sensor data to determine whether correct items are selected in accordance with cold-chain compliant parameters and dropped-off in a timely manner. The system generates incentives for crowdsource shoppers based on accepted items, feedback, and/or per-user cold-chain compliance score/ranking.

The system assigns one or more items from a plurality of perishable items from one or more different grocery orders to a single user for retrieval in other examples. The items retrieved by the user are utilized to partially fill one or more of the orders. Thus, items for filling a single order can be retrieved by multiple different shoppers. Likewise, a single shopper can retrieve items used to partially fill multiple different orders.

In other examples, a user waiting for a service, such as a pharmacy customer waiting for a prescription to be filled or a car-service customer waiting for an oil change or other car maintenance service can elect to retrieve one or more perishable items for grocery order fulfillment during the wait time. The user can also choose to retrieve requested perishable items while waiting for a ride to come and pick them up from the store. The system assigns perishable items having a per-item estimated retrieval time which allows the user to retrieve those items during the estimated wait time in exchange for a reward. In this manner, the user can occupy their time usefully.

In some examples, an alert or alarm is sent to the user device to notify the user that a per-item maximum dwell-time for one or more items is about to expire. The alert is sent a threshold amount of time prior to the expiration of the maximum dwell-time. In some examples, the threshold amount of item is ten minutes. In this example, the alarm or alert includes a ten-minute warning that the maximum dwell-time for an item is about to expire in ten minutes. In another example, the threshold amount of time can be five minutes. In that example, the system outputs a five-minute warning to the user notifying the user that the maximum dwell-time time for an item is about to expire in five minutes. The examples are not limited to a five-minute or ten-minute warning time. The threshold amount of warning time can be any user-configurable amount of time prior to expiration of an item maximum dwell-time.

If one or more items are not delivered to an item intake area within the assigned maximum dwell-time by an identified user, the item assignment to the identified user is canceled and the one or more items are assigned to another user or store personnel for retrieval. This ensures all items are retrieved in a timely manner for delivery to the one or more remote recipients while ensuring cold-chain compliance.

The request fulfillment component in other examples enables crowdsourced cold-chain compliance in partial order fulfillment with lower costs and reduced labor by store employees. The automatic request fulfillment also increases personnel available within the store to assist customers while improving overall efficiency of order-filling.

In other examples, users receive incentives which are commensurate with the number of items they retrieve in compliance with cold-chain rules. Users receive rewards for improved accuracy and quality of items to improve user satisfaction and order verification.

A centralized item intake is provided in some examples via one or more item intake areas located at various locations within a store for scanning and sorting retrieved items. In other examples, the system sends items to a backroom sorter for item intake to build and store totes in ambient, chilled, and frozen areas. Shopping sortation for picks (dividers) can be utilized with pick list optimization logic for crowdsourced order filling.

In one non-limiting example, a user having a mobile user device running the item assignment application arrives at a store. The request fulfillment component prompts the user to pick one or more perishable items assigned to the user in accordance with cold-chain compliance parameters for the item(s). If the user accepts one or more items for retrieval, the system downloads a list of the assigned items to the user via a user interface and/or a user device associated with the user. The user picks the items and scans the items when placing the items in the user's shopping cart. Each item can be scanned using a hand-held scanner or the user device.

In some examples, as the user scans each retrieved item before placing the item in the cart, the scanner sends the scan data to the request fulfillment component. The request fulfillment component analyzes the scan data to identify requested items already selected by the user and placed in the user's cart but not yet dropped off at an intake area. In this manner, the request fulfillment component knows which items have been selected and expected to be dropped off at an intake area and which items have not yet been located/found by the user yet. The scan data can also be used to determine the removal time of each item from a temperature-controlled area.

The request fulfillment component can re-assign items to a different user if the request fulfillment component does not receive scan data for an item indicating it has been picked up by a user by a per-item maximum item selection time. In other words, if the user does not find an item and scan it within the item selection time, the item can be re-assigned to another user. Likewise, if the item is not delivered to an intake area within the per-item maximum dwell-time, the item can be re-assigned to another user. If an item is re-assigned to a second user, the item assignment to the first user is canceled.

If the user completes the shopping list in the item assignment application, the item assignment application prompts the user to drop-off items at one or more item intake areas in other examples. The item intake area scans the items to be sorted and validated for cold-chain compliance. The items are compiled into totes for order fulfillment in a backroom. The request fulfillment component generates and outputs incentives to the user as a reward for each item retrieved that is accepted at the intake area(s).

In some examples, if a threshold number of requests for the same item is received, the item is assigned to personnel to retrieve due to the high number of instances of the item requested. For example, if there are twenty open orders that include at least one carton of eggs, rather than assign a single user to retrieve the twenty cartons of eggs, an associate or other personnel is assigned to retrieve a case containing twenty cartons of eggs from a backroom and deliver the case to the intake area. This improves efficiency of item retrieval.

If one or more items assigned to a user for selection are not scanned within a maximum item selection time, the item is re-assigned to another user. Likewise, if an item assigned to a user is not received at an intake area within a per-item maximum dwell-time, the items are re-assigned to another user or store personnel for retrieval.

A user entering a store or other item selection area is identified in some examples based on a user device associated with the user. The user can also be identified using a user login, user identifier (ID), password, a rewards account, and/or any other type of user identification.

The system retrieves a cold-chain compliance score associated with a user profile for an identified user in one non-limiting example. If the user score is within an acceptable threshold range of scores, the identified user is approved for item retrieval. A list of one or more requested perishable items is selected for the user based on user preferences and user restrictions assigned to the identified user. The user enters preferences via a user interface on a stand-alone kiosk or via a mobile user device. The system removes any items from the list that are restricted and items the user prefers not to retrieve. This enables customized item retrieval based on each user's preferences and scores/ratings for each item, item category, or overall item-retrieval rating.

In another non-limiting example, the system outputs a list of requested items with item retrieval time limits to a user interface associated with an identified user. The user interface can be a stand-alone kiosk, or an interface associated with a mobile user device. If the user rejects one or more of the items in the list, the system redacts the list to remove the rejected one or more items. The redacted list of requested items accepted by the user are output to the user via the user interface.

The system analyzes scan data and feedback received associated with items retrieved by the identified user to determine cold-chain compliance, accuracy, and/or quality of the retrieved items in other examples. The system generates an updated cold-chain compliance score for the user based on the determined actual dwell-time for the item, item quality, and accuracy of the retrieved items. The system outputs one or more incentives based on the updated score.

In other examples, all perishable items are assigned to a first user having a highest cold-chain compliance score without any non-perishable items being assigned to the first user. All non-perishable items are assigned to a second user without any perishable items being assigned to the second user. This enables all cold-chain compliance and dwell-time checks to be limited to the first user. It also enables the first user to focus on selecting items in temperature controlled areas without having to divert to other non-temperature controlled areas during item retrieval.

A crowdsourced system for cold-chain item selection is provided in other examples. The system uses sensor data to check whether cold-chain compliance parameters for items are satisfied. The system tracks item between removal of the item from a temperature-controlled area to intake of the item at another temperature-controlled area. The system generates incentives for crowdsourced shoppers based on accepted items.

The system allows in-store shoppers to shop for other online customers in another example. The system uses sensor data to check whether cold-chain compliance parameters for items are satisfied. Further, in this example the system tracks time between removal of an item from a temperature-controlled area to intake/placement of the item at another temperature-controlled area. The system monitors individual item dwell-time outside of the temperature-controlled areas to identify cold-chain compliance based on per-item parameters. The system generates incentives for crowdsourced shoppers based on accepted perishable items. The crowdsourced shoppers that fail to comply with cold-chain compliance rules are restricted to retrieving items without cold-chain compliance requirements or they are placed on a do not use list.

Alternatively, or in addition to the other examples described herein, examples include any combination of the following:
- wherein the per-item maximum dwell-time is a dynamic per-item maximum dwell-time;
- a dwell-time calculator, implemented on the at least one processor, that calculates the dynamic per-item maximum dwell-time for the selected item in real-time based on item data associated with the selected item and sensor data generated by a set of sensor devices within the item selection area;
- wherein the per-item dwell-time changes as temperature conditions within the item selection area change;
- a feedback component, implemented on the at least one processor, that queries an order-filler preparing an order for at least one recipient that includes at least one item in the selected set of perishable items retrieved by the identified user and queries a user device associated with a recipient of at least one item in the selected set of perishable items for feedback regarding the quality of the at least one item retrieved by the identified user;
- a scoring component, implemented on the at least one processor, that generates the cold-chain compliance score for the identified user based on the feedback provided by the at least one recipient;
- a restriction component, implemented on the at least one processor, that analyzes the cold-chain compliance score associated with the identified user and assigns a cold-item restriction to the identified user on condition the cold-chain compliance score falls outside a threshold range;
- wherein the identified user is restricted from retrieving perishable items associated with at least one cold-chain compliance parameter if a cold-item restriction is assigned to the identified user;
- wherein cold-items having cold-chain compliance parameters are only assigned to users without cold-items restrictions;
- a data storage device accessed by the selection component via a network connection, wherein the data storage device stores a set of cold-chain compliance scores associated with each user in a plurality of users;
- the selection component selects a user from the plurality of users within the item selection area having a highest cold-chain compliance score for retrieval of a cold-item associated with cold-chain compliance parameters;
- a cold-chain compliance score for a dairy category assigned to the user indicating a level of quality of dairy-related items selected by the user, wherein dairy items are assigned to a user having the cold-chain compliance score for the dairy category within a threshold range, wherein users having the cold-chain compliance score for the dairy category below the threshold range are excluded from assignments to retrieve dairy-related items.
- a cold-chain compliance score for a frozen foods category assigned to a user indicating a level of quality of frozen food items selected by the user;
- wherein frozen food items are assigned to a selected user having a cold-chain compliance score for the frozen food category within a threshold range;
- wherein a user having a cold-chain compliance score for the frozen foods category below the threshold range is excluded from assignments to retrieve frozen food items;
- an alert generation component, implemented on the at least one processor, that generates a notification alert within a threshold time prior to an expiration of the per-item maximum dwell-time and transmits the notification alert to a user device associated with the identified user, the notification alert comprising an identification of a perishable item in the selected set of perishable items, an amount of time remaining to deliver the identified perishable item to the intake area, and a location of at least one intake area;
- prompting a recipient of at least one item in the set of perishable items to provide feedback regarding quality of the at least one item;
- generating the cold-chain compliance score for the identified user based on the feedback;
- prompting an order-filler that utilized at least one item in the set of perishable items retrieved by the identified user to complete an order for at least one recipient to provide feedback regarding quality of the at least one item;
- generating the cold-chain compliance score for the identified user based on the feedback;
- assigning one or more perishable items associated with at least one cold-chain compliance parameter to a user having a cold-chain compliance score within a threshold range, wherein a user having a cold-chain compliance score outside the threshold range fails to receive assignment of perishable items associated with cold-chain compliance parameters;
- calculating, by a dwell-time calculator, the dynamic per-item maximum dwell-time for the selected item in real-time based on item data associated with the selected item and sensor data generated by a set of sensor devices within an item selection area, wherein the dwell-time calculator dynamically calculates a new per-item dwell-time when temperature conditions within the item selection area changes a threshold amount;
- selecting a user from a plurality of users within an item selection area having a highest cold-chain compliance score for retrieval of a cold-item associated with cold-chain compliance parameters;
- wherein the cold-chain compliance score further comprises a dairy selection score indicating a level of quality of dairy-related items selected by a user, wherein dairy items are assigned to a user having a dairy selection score within a threshold, wherein diary items are not assigned to a user having a dairy selection score below a threshold range;
- wherein the cold-chain compliance score further comprises a frozen food selection score indicating a level of quality of frozen food items selected by a user, wherein frozen food items are assigned to a user having a frozen food selection score within a threshold range, wherein frozen food items are not assigned to a user having a frozen food selection score below the threshold range;
- generating a notification alert within a threshold time prior to an expiration of the per-item maximum dwell-time;
- transmitting the notification alert to the user device associated with the identified user, the notification alert comprising an identification of a perishable item in the selected set of perishable items, an amount of time remaining to deliver the perishable item to the intake area, and a location of intake area located closest to a current location of the identified user;
- a scoring component, implemented on the at least one processor, that generates a cold-chain compliance score based on the calculated dwell-time and feedback received from a recipient of the at least one perishable item;

a customized reward generator, implemented on the at least one processor, that assigns a customized reward to the selected user on condition the cold-chain compliance score is within a threshold range;

a restriction component, implemented on the at least one processor, that assigns a cold-item restriction to the selected user on condition the cold-chain compliance score is outside the threshold range;

a notification component, implemented on the at least one processor, that sends an alert notification to the user device associated with the selected user, the alert notification indicating the calculated dwell-time of the at least one perishable item is approaching the per-item maximum dwell-time; and wherein the alert notification comprises a location of an intake area and a recommendation to deliver the at least one perishable item to the item intake location prior to expiration of the per-item dwell-time to ensure cold-chain compliance.

At least a portion of the functionality of the various elements in FIG. 1, FIG. 2, FIG. 3, FIG. 4, FIG. 5, FIG. 6, FIG. 7, FIG. 8, FIG. 9, FIG. 10, and FIG. 11 can be performed by other elements in FIG. 1, FIG. 2, FIG. 3, FIG. 4, FIG. 5, FIG. 6, FIG. 7, FIG. 8, FIG. 9, FIG. 10, and FIG. 11, or an entity (e.g., processor, web service, server, application program, computing device, etc.) not shown in FIG. 1, FIG. 2, FIG. 3, FIG. 4, FIG. 5, FIG. 6, FIG. 7, FIG. 8, FIG. 9, FIG. 10, and FIG. 11.

In some examples, the operations illustrated in FIG. 13, FIG. 14, FIG. 15, FIG. 16, and FIG. 17 can be implemented as software instructions encoded on a computer readable medium, in hardware programmed or designed to perform the operations, or both. For example, aspects of the disclosure can be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term `Wi -Fi_ as used herein refers, in some examples, to a wireless local area network using high frequency radio signals for the transmission of data. The term `B LUETOOTH_ as used herein refers, in some examples, to a wireless technology standard for exchanging data over short distances using short wavelength radio transmission. The term `c ellular_ as used herein refers, in some examples, to a wireless communication system using short-range radio stations that, when joined together, enable the transmission of data over a wide geographic area. The term `N FC _ as used herein refers, in some examples, to a short-range high frequency wireless communication technology for the exchange of data over short distances.

While no personally identifiable information is tracked by aspects of the disclosure, examples have been described with reference to data monitored and/or collected from the users. In some examples, notice can be provided to the users of the collection of the data (e.g., via a dialog box or preference setting) and users are given the opportunity to give or deny consent for the monitoring and/or collection. The consent can take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform particular tasks or implement particular abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for customized item selection in grocery order fulfillment. For example, the elements illustrated in FIG. 1, FIG. 2, FIG. 3, FIG. 4, FIG. 5, FIG. 6, FIG. 7, FIG. 8, FIG. 9, FIG. 10, and FIG. 11, such as when encoded to perform the operations illustrated in FIG. 13, FIG. 14, FIG. 15, FIG. 16, and FIG. 17, constitute exemplary means for selecting a set of perishable items from a plurality of requested items for retrieval by an identified user within an item selection area based on a set of per-user restrictions assigned to the identified user, any item in the plurality of requested items that is restricted by at least one restriction in the set of per-user restrictions is excluded from the selected set of perishable items; exemplary means for assigning the selected set of perishable items to the identified user for retrieval in accordance with a set of cold-chain compliance parameters; exemplary means for calculating a dwell-time for each item in the selected set of perishable items assigned to the identified user that is received at an intake area based on an analysis of sensor data received from at least one sensor device associated with the intake area; exemplary means for accepting an item in the set of perishable items retrieved by the identified user on condition the per-item maximum dwell-time exceeds the calculated dwell-time for the item; exemplary means for rejecting any item having a calculated dwell-time that exceeds the per-item maximum dwell-time indicting non-compliance with the cold-chain compliance parameters; and exemplary means for generating an incentive for the identified user based on a cold-chain compliance score associated with the set of perishable items received at the intake area.

In another example, the elements illustrated in FIG. 1, FIG. 2, FIG. 3, FIG. 4, FIG. 5, FIG. 6, FIG. 7, FIG. 8, FIG. 9, FIG. 10, and FIG. 11, such as when encoded to perform the operations illustrated in FIG. 13, FIG. 14, FIG. 15, FIG. 16, and FIG. 17, constitute exemplary means for selecting a set of perishable items from a plurality of requested items within a predetermined range of a location of a user device associated with an identified user for retrieval by the identified user, the selected set of perishable items comprising a per-item maximum dwell-time for each perishable item in the set of perishable items; exemplary means for calculating a dwell-time for each item in the set of assigned items based on an analysis of sensor data received from at least one sensor device associated with the intake area; exemplary means for accepting each item in the set of items delivered to the intake area having a per-item maximum dwell-time that exceeds the calculated dwell-time; exemplary means for rejecting each item in the set of items delivered to the intake area having a calculated dwell-time that exceeds the per-item maximum dwell-time; exemplary means for generating a cold-chain compliance score based on a number of accepted items delivered to the intake area and a number of rejected items; and exemplary means for generating an incentive for the identified user based on the cold-chain compliance score.

In another example, the elements illustrated in FIG. 1, FIG. 2, FIG. 3, FIG. 4, FIG. 5, FIG. 6, FIG. 7, FIG. 8, FIG. 9, FIG. 10, and FIG. 11, such as when encoded to perform the operations illustrated in FIG. 13, FIG. 14, FIG. 15, FIG. 16, and FIG. 17, constitute exemplary means for storing a set of cold-chain compliance scores associated with each user in a plurality of users; exemplary means for selecting a user from a set of users within the item selection area having a cold-chain compliance score within a threshold range to retrieve at least one perishable item having a highest cold-chain compliance score; exemplary means for sending an assignment of the at least one perishable item with cold-chain compliance parameters to a user device associated with the selected user via a network connection; exemplary means for calculating a dwell-time for the at least one perishable item based on sensor data received from at least one sensor device associated with an intake area; and exemplary means for accepting the at least one perishable item on condition the per-item dwell-time exceeds the calculated dwell-time and rejects the at least one perishable item on condition calculated dwell-time exceeds the per-item dwell-time.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term `e xemplary_ is intended to mean `a n example of._ The phrase `o ne or more of the following: A, B, and C_ means `a t least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for cold-chain item retrieval in grocery order fulfillment, the system comprising:
 a memory;
 at least one processor communicatively coupled to the memory;
 a selection component, implemented on the at least one processor, that selects a set of perishable items from a plurality of requested items for retrieval by an identified user within an item selection area based on a set of per-user restrictions assigned to the identified user, any item in the plurality of requested items that is restricted by at least one restriction in the set of per-user restrictions is excluded from the selected set of perishable items;
 an assignment component, implemented on the at least one processor, that assigns the selected set of perishable items to the identified user for retrieval in accordance with a set of cold-chain compliance parameters, the set of cold-chain compliance parameters comprising a per-item maximum dwell-time, the per-item maximum dwell-time specifying a maximum time interval between removal of a perishable item from an assigned temperature controlled display area and receipt of the perishable item at an intake area;
 a dwell-time monitor, implemented on the at least one processor, that calculates a dwell-time for each item in the selected set of perishable items assigned to the identified user that is received at the intake area based on an analysis of sensor data received from at least one sensor device associated with the intake area;

a cold-chain compliance component, implemented on the at least one processor, that accepts an item in the selected set of perishable items retrieved by the identified user on condition the per-item maximum dwell-time exceeds the calculated dwell-time for the item and rejects an item in the selected set of perishable items retrieved by the identified user on condition the calculated dwell-time exceeds the per-item maximum dwell-time indicting non-compliance with the set of cold-chain compliance parameters; and an incentives generation component, implemented on the at least one processor, generates an incentive for the identified user based on a cold-chain compliance score associated with the selected set of perishable items received at the intake area, the cold-chain compliance score indicating a level of compliance with the set of cold-chain compliance parameters.

2. The system of claim 1, wherein the per-item maximum dwell-time is a dynamic per-item maximum dwell-time, and further comprising:

a dwell-time calculator, implemented on the at least one processor, that calculates the dynamic per-item maximum dwell-time for the selected item in real-time based on item data associated with the selected item and sensor data generated by a set of sensor devices within the item selection area, wherein the dynamic per-item dwell-time changes as temperature conditions within the item selection area change.

3. The system of claim 1, further comprising:

a feedback query component, implemented on the at least one processor, that queries an order-filler preparing an order for at least one recipient that includes at least one item in the selected set of perishable items retrieved by the identified user and queries a user device associated with a recipient of at least one item in the selected set of perishable items for feedback regarding quality of the at least one item retrieved by the identified user; and a scoring component, implemented on the at least one processor, that generates the cold-chain compliance score for the identified user based on the feedback provided by the at least one recipient.

4. The system of claim 1, further comprising:

a restriction component, implemented on the at least one processor, that analyzes the cold-chain compliance score associated with the identified user and assigns a cold-chain compliance restriction to the identified user on condition the cold-chain compliance score falls outside a threshold range, wherein the identified user is restricted from retrieving perishable items associated with at least one cold-chain compliance parameter if a cold chain compliance restriction is assigned to the identified user, wherein an item having any cold-chain compliance parameters is only assigned to users without cold chain compliance restrictions.

5. The system of claim 1, further comprising:

a data storage device accessed by the selection component via a network connection, wherein the data storage device stores a set of cold-chain compliance scores associated with each user in a plurality of users; and the selection component selects a user from the plurality of users within the item selection area having a highest cold-chain compliance score for retrieval of an item associated with at least one cold-chain compliance parameter.

6. The system of claim 1, wherein the cold-chain compliance score further comprises:

a cold-chain compliance score for a dairy category assigned to the user indicating a level of quality of dairy-related items selected by the user, wherein dairy items are assigned to a user having the cold-chain compliance score for the dairy category within a threshold range, wherein users having the cold-chain compliance score for the dairy category below the threshold range are excluded from assignments to retrieve dairy-related items.

7. The system of claim 1, further comprising:

a cold-chain compliance score for a frozen foods category assigned to the user indicating a level of quality of frozen food items selected by the user, wherein frozen food items are assigned to users having the cold-chain compliance score for the frozen food category within a threshold range, wherein users having cold-chain compliance score for the frozen foods category below the threshold range are excluded from assignments to retrieve frozen food items.

8. The system of claim 7, further comprising:

an alert generation component, implemented on the at least one processor, that generates a notification alert within a threshold time prior to an expiration of the per-item maximum dwell-time and transmits the notification alert to a user device associated with the identified user, the notification alert comprising an identification of a perishable item in the selected set of perishable items, an amount of time remaining to deliver the identified perishable item to the intake area, and a location of at least one intake area.

9. A computer-implemented method for customized item retrieval in grocery order fulfillment, the computer-implemented method comprising:

selecting a set of perishable items from a plurality of requested items within a predetermined distance of a location of a user device associated with an identified user for retrieval by the identified user;

calculating a dwell-time for each item in the set of assigned items based on an analysis of sensor data received from at least one sensor device associated with an intake area, the calculated dwell-time specifying an amount of time between removal of a perishable item from an assigned temperature controlled display area and receipt of the item at the intake area;

accepting each item in the set of items delivered to the intake area having a per-item maximum dwell-time exceeding the calculated dwell-time, the per-item maximum dwell-time specifying a maximum threshold time interval between removal of the perishable item from the assigned temperature controlled display area and receipt of the item at the intake area;

rejecting each item in the set of items delivered to the intake area having the calculated dwell-time exceeding the per-item maximum dwell-time;

generating a cold-chain compliance score based on a number of accepted items delivered to the intake area and a number of rejected items; and generating an incentive for the identified user based on the cold-chain compliance score.

10. The computer-implemented method of claim 9, further comprising:
prompting a recipient of at least one item in the set of perishable items to provide feedback regarding quality of the at least one item; and
generating the cold-chain compliance score for the identified user based on the feedback.

11. The computer-implemented method of claim 9, further comprising:
prompting an order-filler that utilized at least one item in the set of perishable items retrieved by the identified user to complete an order for at least one recipient to provide feedback regarding quality of the at least one item; and
generating the cold-chain compliance score for the identified user based on the feedback.

12. The computer-implemented method of claim 9, further comprising:
assigning one or more perishable items associated with at least one cold-chain compliance parameter to a user having a cold-chain compliance score within a threshold range, wherein a user having a cold-chain compliance score outside the threshold range fails to receive assignment of perishable items associated with cold-chain compliance parameters.

13. The computer-implemented method of claim 9, wherein the per-item maximum dwell-time is a dynamic per-item maximum dwell-time, and further comprising:
calculating, by a dwell-time calculator, the dynamic per-item maximum dwell-time for the selected item in real-time based on item data associated with the selected item and sensor data generated by a set of sensor devices within an item selection area, wherein the dwell-time calculator dynamically calculates a new per-item dwell-time when temperature conditions within the item selection area changes a threshold amount.

14. The computer-implemented method of claim 9, further comprising:
selecting a user from a plurality of users within an item selection area having a highest cold-chain compliance score for retrieval of an item associated with cold-chain compliance parameters.

15. The computer-implemented method of claim 9, wherein the cold-chain compliance score further comprises a dairy selection score indicating a level of quality of dairy-related items selected by a user, wherein dairy items are assigned to a user having a dairy selection score within a threshold range, wherein diary items are not assigned to a user having a dairy selection score outside the threshold range.

16. The computer-implemented method of claim 9, wherein the cold-chain compliance score further comprises a frozen food selection score indicating a level of quality of frozen food items selected by a user, wherein frozen food items are assigned to a user having a frozen food selection score within a threshold range, wherein frozen food items are not assigned to a user having a frozen food selection score below the threshold range.

17. The computer-implemented method of claim 9, further comprising:
generating a notification alert within a threshold time prior to an expiration of the per-item maximum dwell-time; and
transmitting the notification alert to the user device associated with the identified user, the notification alert comprising an identification of a perishable item in the set of perishable items, an amount of time remaining to deliver the perishable item to the intake area, and a location of intake area located closest to a current location of the identified user.

* * * * *

UNITED STATES PATENT AND TRADEMARK OFFICE
CERTIFICATE OF CORRECTION

PATENT NO. : 11,157,870 B2  
APPLICATION NO. : 16/231413  
DATED : October 26, 2021  
INVENTOR(S) : David Blair Brightwell et al.

Page 1 of 1

It is certified that error appears in the above-identified patent and that said Letters Patent is hereby corrected as shown below:

In the Specification

In Column 18, Line 25, delete ""A_"" and insert --"A"--.

In Column 18, Line 25, delete ""C_"" and insert --"B"--.

In Column 18, Line 26, delete ""A A_"" and insert --"AA"--.

In Column 18, Line 26, delete ""A_"" and insert --"A"--.

In Column 18, Line 28, delete ""B_"" and insert --"B"--.

In Column 18, Line 64, delete ""CC_"" and insert --"C"--.

In Column 18, Line 64, delete ""D._"" and insert --"D"--.

Signed and Sealed this  
Fifth Day of April, 2022

Drew Hirshfeld  
*Performing the Functions and Duties of the*  
*Under Secretary of Commerce for Intellectual Property and*  
*Director of the United States Patent and Trademark Office*